US008131543B1

(12) United States Patent
Weiss et al.

(10) Patent No.: US 8,131,543 B1
(45) Date of Patent: Mar. 6, 2012

(54) SPEECH DETECTION

(75) Inventors: Ron J. Weiss, New York, NY (US); Trausti Kristjansson, Hartsdale, NY (US)

(73) Assignee: Google Inc., Mountain View, CA (US)

( * ) Notice: Subject to any disclaimer, the term of this patent is extended or adjusted under 35 U.S.C. 154(b) by 819 days.

(21) Appl. No.: 12/102,611

(22) Filed: Apr. 14, 2008

(51) Int. Cl.
*G10L 15/00* (2006.01)

(52) U.S. Cl. ........ 704/233; 704/236; 704/240; 704/210; 704/226

(58) Field of Classification Search .................. 704/233, 704/236, 240, 210, 226
See application file for complete search history.

(56) References Cited

U.S. PATENT DOCUMENTS

| | | | | |
|---|---|---|---|---|
| 6,408,269 B1 * | 6/2002 | Wu et al. | ........................ | 704/228 |
| 6,615,170 B1 * | 9/2003 | Liu et al. | ........................ | 704/233 |
| 2002/0013697 A1 * | 1/2002 | Gong | ............................ | 704/225 |
| 2005/0182624 A1 * | 8/2005 | Wu et al. | ........................ | 704/233 |
| 2006/0155537 A1 * | 7/2006 | Park et al. | ...................... | 704/243 |
| 2006/0195317 A1 * | 8/2006 | Graciarena et al. | ........... | 704/233 |
| 2010/0057453 A1 * | 3/2010 | Valsan | .......................... | 704/232 |

OTHER PUBLICATIONS

Bahl et al. "Performance of the IBM Large Vocabulary Continuous Speech Recognition System on the ARPA Wall Street Journal Task", IEEE, 1995.*

Fujimoro, et al. "Noise Robust Voice Activity Detection Based on Switching Kalman Filter" *IEICE Trans. Inf. & Syst.*, vol. E91-D, No. 3 (Mar. 2008) pp. 467-477.

Rennie, et al. "Dynamic Noise Adaptation" IBM T.J. Watson Research Center Yorktown Heights, NY 10598, USA *Acoustics, Speech and Signal Processing, 2006. ICASSP 2006 Proceedings. 2006 IEEE International Conference*, vol. 1 (May 14-19, 2006) 4 pages.

* cited by examiner

*Primary Examiner* — Qi Han
(74) *Attorney, Agent, or Firm* — Fish & Richardson P.C.

(57) ABSTRACT

The subject matter of this specification can be embodied in, among other things, a method that includes receiving an audio signal, determining an energy-independent component of a portion of the audio signal associated with a spectral shape of the portion, and determining an energy-dependent component of the portion associated with a gain level of the portion. The method also comprises comparing the energy-independent and energy-dependent components to a speech model, comparing the energy-independent and energy-dependent components to a noise model, and outputting an indication whether the portion of the audio signal more closely corresponds to the speech model or to the noise model based on the comparisons.

30 Claims, 18 Drawing Sheets

Speech Model

Noise Model

SPEECH DETECTION

TECHNICAL FIELD

This instant specification relates to speech or noise detection.

BACKGROUND

Some speech recognition systems attempt to classify portions of an audio signal as speech. These systems may then selective transmit the portions that appear to be speech to a speech decoder for further processing. Speech recognition systems may attempt to classify the portions of an audio signal based on an amplitude of the signal. For example, the systems may classify a portion of an audio signal as speech if the portion has a high amplitude.

Classification schemes may operate on an assumption that speech is more likely to have a higher amplitude than that of noise. However, loud background noises or significant interference of the audio signal caused by a device in the transmission chain may generate noise with a high amplitude. In these cases, a classification scheme that relies upon signal amplitude may misclassify frames that contain noise as containing speech.

SUMMARY

In general, this document describes systems and methods for determining whether a portion of a signal represents speech or noise using both gain-dependent and gain-independent features of the portion to make the determination.

In a first general aspect, a computer-implemented method is described. The method includes receiving an audio signal, determining an energy-invariant component of a portion of the audio signal associated with a spectral shape of the portion, and determining an energy-variant component of the portion associated with a gain level of the portion. The method also comprises comparing the energy-invariant and energy-variant components to a speech model, comparing the energy-invariant and energy-variant components to a noise model, and outputting an indication whether the portion of the audio signal more closely corresponds to the speech model or to the noise model based on the comparisons.

In another general aspect, a system is described. The system includes a signal feature calculator to determine energy-variant and energy-invariant Mel-frequency cepstral coefficients (MFCC) components associated with a portion of a received audio signal, means for classifying the portion of the audio signal as speech or noise based on a comparison of the determined energy-variant and energy-invariant MFCC components to a speech model and a noise model, and an interface to output an indication of whether the portion of the audio signal is classified as speech or noise.

The systems and techniques described here may provide one or more of the following advantages. A system can provide speech detection that uses both gain-invariant and gain-dependent features of an audio signal in classifying the signal as noise or speech. The system may rely almost exclusively on the gain-invariant features before estimates for the background noise and speech levels are determined with a specified confidence. Additionally, use of a bi-variate dynamic distribution may result in more accurate classification of a signal portion as including speech or noise by enforcing restrictions on individual levels (i.e., the speech and noise levels) as well as simultaneously restricting relative levels between the two (i.e., a signal-to-noise ratio (SNR)).

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
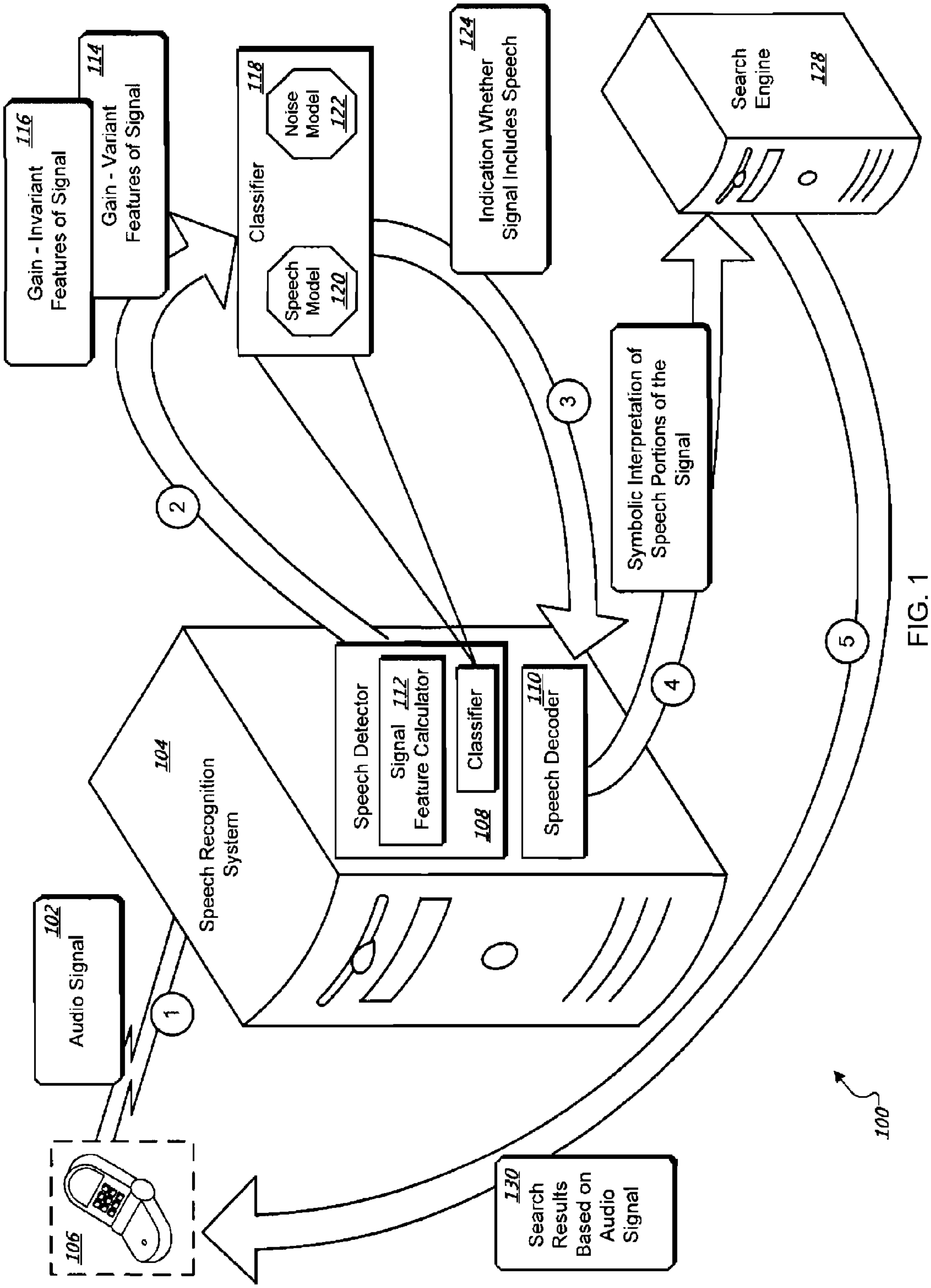
FIG. 1 is a diagram of an example system for determining whether a received audio signal should be classified as noise or speech.

This document describes example systems, methods, computer program products, and techniques for classifying received audio as either noise or speech. In some implementations, a system for classifying the audio includes statistical models of speech and noise. The models can incorporate, for example, Mel-frequency cepstral coefficients (MFCCs), which represent both signal level, or gain dependent, features of an audio signal and features that are independent of gain, such as features that are relevant to a signal's spectral shape.

In some implementations, an audio signal is sampled so that it is represented as a sequence of digital audio frames, and the system can processes each frame sequentially. For example, the system can calculate MFCCs for each frame and classify the frame as including speech or noise based on probabilities generated by comparing the frame to the speech and noise models. In some implementations, the models include a current estimate of the speech and/or noise gain level:

$$P(\text{frame contains speech}) = \frac{P(\text{speech} \mid \text{current frame, speech level estimate})}{(P(\text{speech} \mid \text{current frame, speech level estimate}) + P(\text{speech} \mid \text{current frame, noise level estimate}))}. \quad (1)$$

In some implementations, if the probability P(frame contains speech) is, for example, greater than some threshold, the system classifies the frame as containing speech.

Additionally, in some implementations, the system uses the probability to predict speech and noise levels (e.g., gain levels) for a subsequent audio frame. For example, the system may predict estimated gain levels using an extended Kalman filter, where the system's confidence in speech and noise level estimates may be expressed as a probability distribution over the estimated gain levels. In some implementations, large variances over the distribution may imply that a confidence in the estimates is low.

According to some implementations, gain level estimates may be constrained so that the estimates are consistent with prior knowledge of an expected signal-to-noise ratio (SNR) of a received signal. For example, the system can include constraints that specify that a signal including speech will have a gain level higher than noise and that the SNR will fall within a range such as 5 dB<SNR<25 dB. Additionally, some implementations may also include restraints on the individual gain levels associated with the noise and speech signals. For example, the system may constrain the speech model so that it restricts speech levels to a range within "soft" boundaries based on a dynamic distribution (e.g., Gaussian distribution).

In an example implementation, the statistical speech and noise models may include Gaussian mixture models having a diagonal covariance. For these models each feature dimension (e.g., each MFCC component) of a signal represented in an observed frame may be modeled separately as a Gaussian random variable. Additionally, because most MFCC components are invariant to a gain level of the signal, the majority of the signal's MFCC components are independent of gain level estimates. This may imply that the previously described confidence in predicted gain levels used to determine whether the signal is speech or noise primarily affects the system's ability to distinguish speech from noise using gain-dependent features of the signal.

In contrast, the system's ability to make this determination using gain-independent MFCC components may be substantially unaffected. Thus, in some implementations, the system may rely less on the gain-dependent features when the previously described confidence level is low (e.g., before the system has received enough frames to accurately classify subsequent frames as noise or speech based on a frame's gain level). Instead, the system may rely more heavily on the gain-independent features to categorize the signal as noise or speech.

This may permit the system to use the gain-independent, or level-invariant, features to make an accurate speech or noise classification even when there is a severe mismatch between a gain level of a prior model and a current observed gain level for a signal. For example, the above described example implementation may avoid incorrectly classifying a frame of a signal as speech or noise due to a gain level of a previously received frame of the signal (e.g., a very loud noise may be incorrectly classified as speech solely due to the fact that the observed signal level is closer to that of the speech model than that of the noise model).

For the purposes of this document, the terms gain and energy level are used interchangeable. Additionally, the terms independent and invariant (and dependent and variant) are used interchangeable.

FIG. 1 is a diagram of an example system 100 for determining whether a received audio signal 102 should be classified as noise or speech. The system 100 may include a speech recognition system 104 and an audio device 106 such as a cell phone for transmitting the audio signal 102. In the implementation of FIG. 1, the speech recognition system 104 may include a speech detector 108 that detects whether portions of the received audio include speech or background noise. The speech recognition system 104 can forward portions that include speech to a speech decoder 110, which may translate the audio into a textual representation of the audio. In this implementation, the speech decoder 110 is illustrated as part of the speech recognition system 104; however, in other implementations, the speech decoder 110 can be implemented on another server or multiple servers.

In FIG. 1, an arrow labeled "1" indicates a transmission of the audio signal 102 from the audio device 106 to the speech recognition system 104. The speech detector 108'associated with the speech recognition system 104—can include a signal feature calculator 112 that extracts, or derives, characteristic features of the audio signal 102. For example, the speech detector 108 can break the received audio signal 102 into digital frames or signal portions. The signal feature calculator 112 can determine both gain-dependent 114 and gain-independent 116 characteristics for the frames. For example, some features of the signal with the frames may vary in gain depending an energy level (e.g., loudness) of audio used to generate the audio signal. Other features may be independent of energy level such as spectral shape features of the audio signal. In other implementations, the signal feature calculator 112 can determine gain dependent features such as autocorrelation is based features and gain independent features such as normalized autocorrelation based features. In yet another implementation, the signal feature calculator 112 can determine gain independent perceptual linear prediction (PLP) features in addition to deriving an energy-based component that is gain dependent.

As indicated by an arrow labeled "2," the signal feature calculator 112 can transmit the gain-variant 114 and gain-invariant 116 features of a frame to a classifier 118 that compares the features 114, 116 with gain-invariant and gain-variant components of a speech model 120 and a noise model 122. The classifier 118 can classify the frame as speech or noise based on which model has features that best match the gain-invariant 116 and gain-variant 114 features of the signal frame. In some implementations, the classifier 118 can send an indication 124 of whether the frame includes speech (or noise) to the speech decoder 110 as indicated by an arrow labeled "3."

In some implementations, the speech decoder 110 can access and decode digital frames that are associated with speech (as specified by indications receive a classifier 118). Digital frames associated with noise can be ignored or discarded.

In some implementations, the decoded symbolic interpretation 126 of the speech portions of the signal can be transmitted to another system for processing. For example, the speech recognition system 104 can transmit the symbolic interpretation 126 to a search engine 128 (as indicated by an arrow labeled "4") for use in initiating a search of Internet web pages. In this example, the search engine 128 can transmit the search results 132 the audio device 106 as indicated by an arrow "5."

For a user of the audio device 106 this process may occur as follows: a user can access a web page using a browser installed on a cell phone 106. The search web page prompts the user to speak a search term or search phrase. The cell phone 106 transmits the spoken search as the audio signal 102 to the speech recognition system 104. The speech recognition system 106 determines which portions of the audio signal are speech and decode these portions. The speech recognition system 104 transmits the decoded speech portions to the search engine 128, which initiate a search using the decoded search term and returns the search results 130 for display on the cell phone 106.

The numbered arrows illustrate an example sequence of steps involved in speech/noise detection, however, the sequence is primarily for use in explanation and is not intended to limit the number or order of steps used to detect speech or noise. For example, so steps shown in FIG. 1 may occur in a different order, such as in parallel. In other implementations, additional steps may be added, replaced, or some steps can be removed. For example, a step illustrated by the arrow labeled "4" may be modified so that the symbolic representation of the speech within the signal is transmitted directly to the cell phone 106 for display to a user for confirmation.

Figure 2:
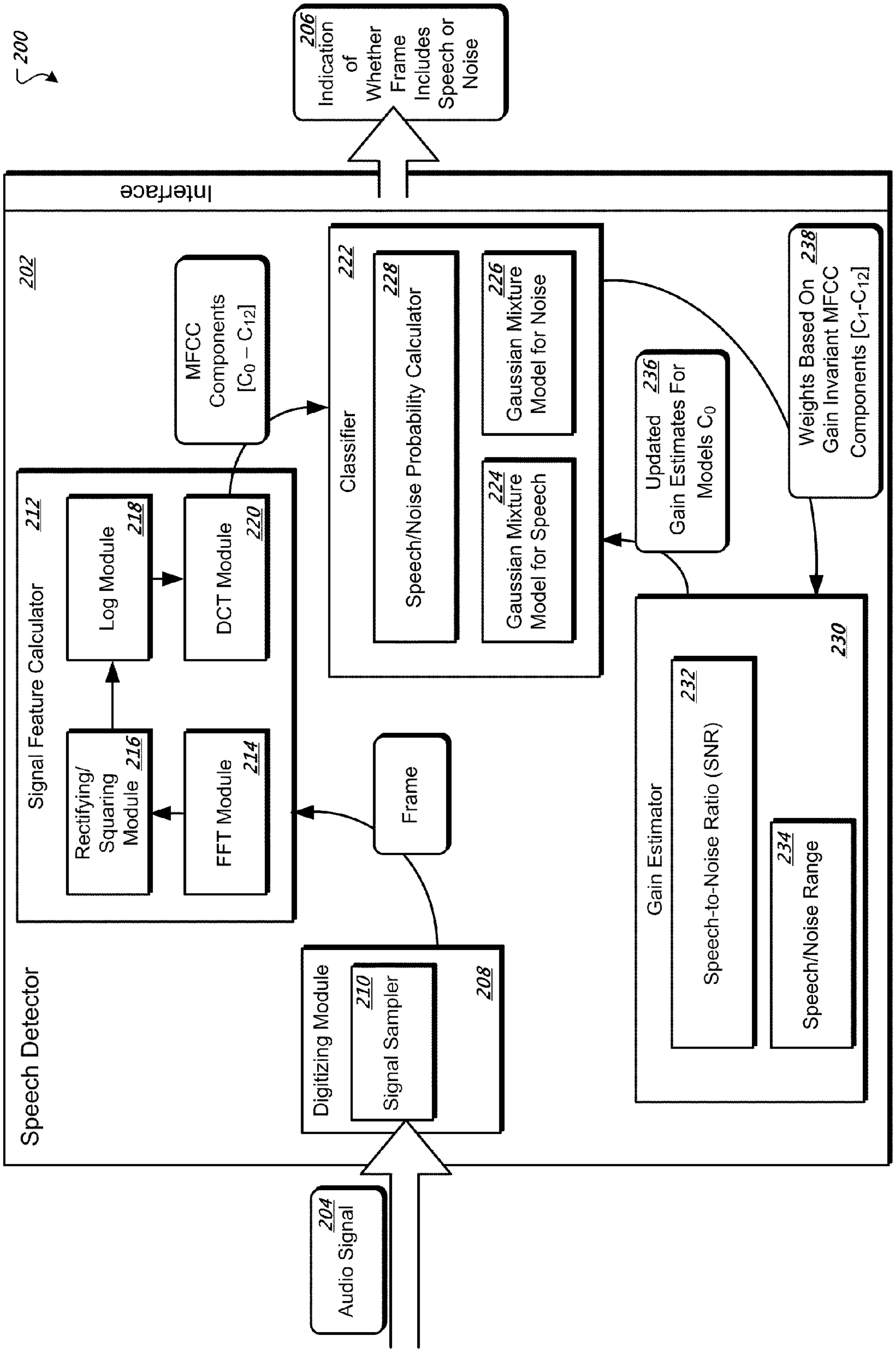
FIG. 2 is a diagram of an example system for identifying portions of an audio signal that include speech (or noise) using Mel-frequency cepstral coefficients (MFCC) components of the audio signal.

FIG. 2 is a diagram of an example system 200 for identifying portions of an audio signal that include speech (or noise) using MFCC components of the audio signal. The example system 200 includes a speech detector 202 that receives an audio signal 204 and outputs an indication 206 of whether a frame of the signal includes speech or noise.

The speech detector 202 includes a digitizing module 208 that can digitize the audio signal 204. For example, the audio signal 204 may be an analog signal. The digitizing module 208 can include a signal sampler 210 that samples of the analog signal to generate a digital representation. The digitized signal can be divided into digital frames, or portions, of the audio signal that are sent to a signal feature calculator 212. In some implementations, the audio signal 204 is received as a digital signal. In this case, the digitizing module may be replaced with a module that merely portions the digital signal into discrete frames formatted so that the speech detector can process the frames as subsequently described.

In some implementations, the signal feature calculator 212 can generate MFCC components based on a received frame. For example, the signal feature calculator 212 can include a FFT (Fast Fourier Transform) module that performs a Fourier transform on the received frame. The FFT-processed frame can be rectified and squared by a rectifying/squaring module 216.

Additionally, the signal feature calculator 212 can include a Mel scale filter module 218 that may map the amplitudes of a spectrum obtained from previous processing onto a mel scale (i.e., a perceptual scale of pitches that were determined by listeners to be substantially equal in distance from one another) using, for example, triangular overlapping windows. Additionally, the Mel scale filter module 218 may compute the log of the magnitude spectrum or Mel-scale magnitude spectrum.

A discrete cosine transform (DCT) module can take the DCT of the resulting mel log-amplitudes as if they represented a signal according to some implementations. The resulting output can include, for example, MFCC components C0-C22. For clarity of explanation, the indices 0-22 are used to label the components; however, the actual component indices can vary. In some implementations, the gain invariant component, C0, is a (scaled) sum of the component magnitudes or magnitude spectrum.

In some implementations, a portion of the MFCC components can be discarded. For example, the signal feature calculator 212 can transit C0-C12 and discard the components C13-C22. However, the number of component (e.g., in the previous implementation) used in the analysis may vary depending on a number of Mel filters. Consequently, other implementations may use varying numbers of components. The use of 13 components in the following description is for illustrative purposes only and is not meant to be limiting in any way. Similarly, the maximum index (e.g., 22 in the previous implementation) may vary depending on the FFT length and the number of filters in a Mel filterbank.

Whether a component is gain invariant or not may depend on the components of the linear transform. In the given example, the linear transform is a DCT which separates the components into completely gain invariant and gain variant components. If a different Linear transform is used, the system may generate components having various degrees of gain variance.

In some implementations, signal feature calculator 212 transmits the MFCC components to a classifier 222 for use in determining whether the frame associated with the components should be classified as noise or speech. The classifier 222 can include comparing the MFCC components to models that include distributions of MFCC component values that are typically associated with speech or noise.

For example, the classifier can include or access a Gaussian mixture model for speech 224 and a Gaussian mixture model for noise 226. In some implementations, each Gaussian mixture model includes one or more distributions associated with each MFCC component. For example, the speech and noise models can each include thirteen Gaussian distributions—one for each of the C0 through C12 components. The classifier 222 can use a speech/noise probability (SNP) calculator to determine the probabilities that a frame is associated with noise, speech, or both.

For example, the SNP calculator 228 can compare the MFCC components to the corresponding Gaussian distributions. In one implementation, the closer the MFCC component value is to the mean of the corresponding distribution, the higher the probability that the MFCC component should be associated with the model that includes the distribution. In a simple example, if eight of thirteen MFCC components more closely correspond to the mean the Gaussian distributions associated with the speech model, the SNP calculator 228 can classify the frame associated with the MFCCs as speech.

In other examples—some of which are subsequently discussed—the SNP calculator executes more complicated determinations of probability (e.g., different Gaussian distributions can be weighted more heavily than others, correspondence of a MFCC component to the mean of a distribution is weighted more heavily for some distributions, etc.).

Figure 4A:
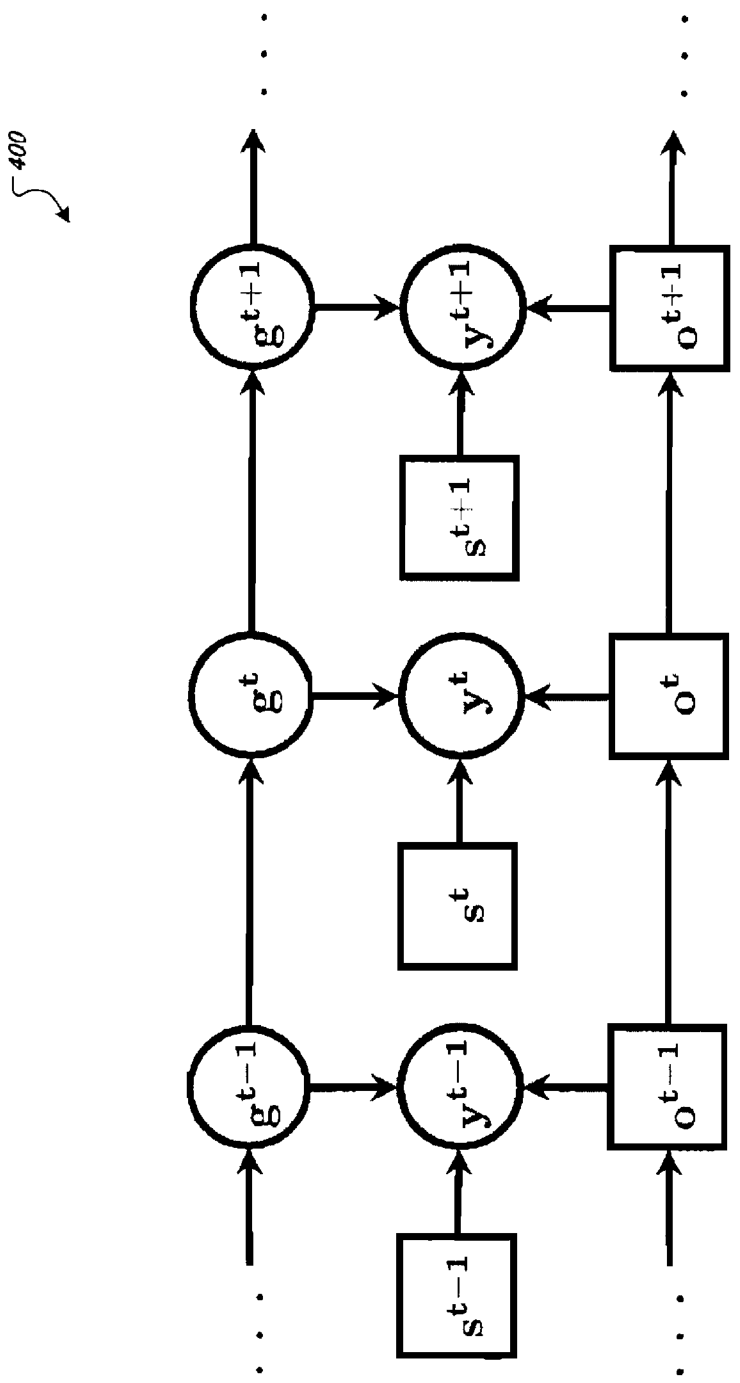
FIGS. 4A, 4B, and 4C show an example model used to classify a signal portion as speech or noise and example Gaussian components of the model, respectively.

In some implementations, the models 224, 226 are generated using a hybrid of an extended Kalman filter and a hidden marker model (HMM) that operates as a dynamic Bayesian network as illustrated in FIG. 4A. In the hybrid model 400 of FIG. 4A, $g^t$ represents the gain under each model for a particular time t (i.e., $g^t=[g_x^t,g_n^t]^T$). These nodes may be considered the hidden variables in the HMM. The $s^t$ may represent the Gaussian mixture component under each model (i.e., $s^t=[s_x^t,s_n^t]^T$). For example, in the case where the multiple distributions are included in the Gaussian mixture model, s can specify a particular distribution. $y^t$ represents an observation at time t. $o^t$ may represent a selection of which model best explains the observation, e.g., $$o^t = \begin{cases} 1, & \text{if speech dominates (i.e., speech occludes background noise)} \\ 0, & \text{if noise dominates.} \end{cases}$$

In generating an observation from the model, values can be selected for the o, g, and s values to generate observation y (i.e., a vector of MFCC values). In use of the model for predictive purposes, observation y can be derived from the received MFCC components and a particular s can be selected. The SNP calculator 228 can use previously generated model to derive g and o. The occlusion variable o indicates whether the received observation fits better with the speech or the noise model. The previous values of g and o also influence the new derived values for g and o as will be subsequently described.

In some implementations, for each frame, a gain estimator 230 can estimate a global gain across all mixture components for each model. In some implementations, the gain estimator 230 can enforce temporal constraints. In some applications, the dynamic distribution of the gain estimator can 1) prevent the gain estimates from changing too rapidly, 2) enforce that the gain values separately lie in reasonable predetermined ranges and 3) to enforce that the relative values of the speech and noise gains lie in a reasonable pre-determined range. For example, the gain estimator 230 may enforce a speech-to-noise ratio (SNR) 232 and a speech/noise range 234. In some implementations the occlusion dynamic distribution, or occlusion transition matrix, prevents switching between speech and noise too rapidly.

In some implementations, the gain estimator 230 can estimate gain estimates 236 used update the models 224, 226 based on weights derived from gain invariant components 238 of a signal portion within a frame as indicated by arrows in FIG. 2 and as more fully described below. For example, the joint distribution of parameters for a single time step can be factored as:

$$P(g^t,s^t,y^t,o^t|y_{0:t-1})=P(y^t|s^t,g^t,o^t)P(s^t)P(g^t|y_{0:t-1})P(o^t|y_{0:t-1}), \quad (3)$$

where $P(s^t)$ is the gaussian mixture prior for the component of the speech or noise model, $P(o^t|y_{0:t-1})$ is the conditional prior for the occlusion variable described below, and the observation likelihood $$P(y^t \mid s^t, g^t, o^t) = \begin{cases} N\left(y^t; \mu_{n,s_n^t} + \begin{bmatrix} 0 \\ g_n^t \end{bmatrix}, \sum_{n,s_n^t}\right), & o^t = 0 \\ N\left(y^t; \mu_{x,s_x^t} + \begin{bmatrix} 0 \\ g_x^t \end{bmatrix}, \sum_{x,s_x^t}\right), & o^t = 1 \end{cases} \quad (4)$$

is a component of the Gaussian mixture model.

In some implementations an additive observation model may be used instead of the occlusion observation model in equation 4.

The term $$P(g^t \mid y_{0:t-1}) = N\left(g^t; \mu_{g^t}, \sum_{g^t}\right) = N\left(\begin{bmatrix} g_x^t \\ g_n^t \end{bmatrix}; \begin{bmatrix} \mu_{g_x^t} \\ \mu_{g_n^t} \end{bmatrix}, \begin{bmatrix} \sigma_{g_x^t} & \sigma_{g^t}^{xn} \\ \sigma_{g^t}^{xn} & \sigma_{g_n^t} \end{bmatrix}\right) \quad (5)$$

is the conditional prior for the gain. $P(s^t)$ and $P(o^t|y_{0:t-1})$ may be multinomial distributions.

In some implementations, the classifier 222 can use inference and parameter updates to determine the solution for o and g. For example, the classifier 222 can classify each frame as being dominated by speech or noise based on the conditional posterior of $o^t$, $P(o^t=1|y_{0:t})$. In some implementations, the conditional posterior of $o^t$ may be used to determine if the observation $y^t$ contains speech or noise by comparing the posterior to a threshold. If $P(o^t=1|y_{0:t})>T$, where T is a predetermined threshold, the observation may be labeled as containing speech. If $P(o^t=1|y_{0:t})\leqq T$ the observation may be labeled as containing noise.

The conditional prior of $o^t$ may be calculated as $$P(o^t \mid y_{0:t}) = \frac{P(o^t \mid y_{0:t-1})P(y^t \mid o^t, y_{0:t-1})}{P(o^t = 0 \mid y_{0:t-1})P(y^t \mid o^t = 0, y_{0:t-1}) + P(o^t = 1 \mid y_{0:t-1})P(y^t \mid o^t = 1, y_{0:t-1})} \quad (6)$$

where $P(o^t=1|y_{0:t-1})$ and $P(o^t=0|y_{0:t-1})$ are the conditional occlusion priors, and observation likelihood is $$\begin{aligned} P(y^t \mid o^t = 1, y_{0:t-1}) &= \int_{g^t} P(g^t \mid y_{0:t-1}) P(y^t \mid g^t, o^t = 1) \quad (7) \\ &= \int_{g^t} P(g^t \mid y_{0:t-1}) \sum_{s^t} P(s^t) P(y^t \mid s^t, g^t, o^t = 1) \\ &= \sum_{s_x^t} P(s_x^t) \int_{g_x^t} \int_{g_n^t} N\left(g^t; \mu_{g^t}, \sum_{g^t}\right) N\left(y^t; \mu_{x,s_x^t} + \begin{bmatrix} 0 \\ g_x^t \end{bmatrix}, \sum_{x,s_x^t}\right) \\ &= \sum_{s_x^t} P(s_x^t) \int_{g_x^t} N\left(y^t; \mu_{x,s_x^t} + \begin{bmatrix} 0 \\ g_x^t \end{bmatrix}, \sum_{x,s_x^t}\right) \int_{g_n^t} N\left(g^t; \mu_{g^t}, \sum_{g^t}\right) \\ &= \sum_{s_x^t} P(s_x^t) \int_{g_x^t} N\left(y^t; \mu_{x,s_x^t} + \begin{bmatrix} 0 \\ g_x^t \end{bmatrix}, \sum_{x,s_x^t}\right) N\left(g_x^t; \mu_{g_x^t}, \sigma_{g_x^t}\right) \\ &= \sum_{s_x^t} P(s_x^t) \int_{g_x^t} z_x(y^t) N(g_x^t; \mu_l, \sigma_l) \\ &= \sum_{s_x^t} P(s_x^t) z_x(y^t), \end{aligned}$$

where a gain-adapted gaussian mixture component is $$z_x(y^t) = N\left(y^t; \mu_{x,s_x^t} + \begin{bmatrix} 0 \\ 1 \end{bmatrix} \mu_{g_x^t}, \begin{bmatrix} \sum_{x,s_x^t,1:D} & 0 \\ 0 & \sigma_{g_x^t} + \sigma_{x,s_x^t,0} \end{bmatrix}\right). \quad (8)$$

Similarly, $$P(y^t \mid o^t = 0, y_{0:t-1}) = \sum_{s_n^t} P(s_n^t) z_n(y^t), \quad (9)$$

where $$z_n(y^t) = N\left(y^t; \mu_{n,s_n^t} + \begin{bmatrix} 0 \\ 1 \end{bmatrix} \mu_{g_n^t}, \begin{bmatrix} \sum_{n,s_n^t,1:D} & 0 \\ 0 & \sigma_{g_n^t} + \sigma_{n,s_n^t,0} \end{bmatrix}\right). \quad (10)$$

In some implementations, parameters of the covariance matrix of Gaussian mixture components are comprised of gain dependent components and gain independent components. In the case of a speech mixture component $s_x$, the variance parameter $\sigma_{g_x^t}+\sigma_{x,s_x^t,0}$ is the gain dependent component and $\Sigma_{x,s_x^t,1:D}$ is the gain independent component.

The relative influence of the gain dependent and gain independent components of the to model may be determined by the conditional prior gain variance $\sigma_{g_x^t}$. If the prior gain variance is large in relation to the other covariance components, then the influence of the gain dependent component of the model may be small in determining the fit of the model to the observation $y^t$.

In some implementations, the covariance matrix may be diagonal. In this case, Equation 11 can be rewritten as $$z_x(y^t) = \frac{1}{Z}\exp\left[\left(\sum_{i=1}^{D} w_i\cdot\left(y_i^t-\mu_{x,s_x^t,i}\right)^2\right) + w_0\cdot\left(y_0^t-\left(\mu_{x,s_x^t,0}+\mu_{g_x^t}\right)\right)^2\right], \quad (11)$$

where Z is a normalizing factor. The weights of the energy independent components are $$w_i = \frac{-0.5}{\sigma_{x,s_x^t,i}} \quad (12)$$

and the weight of the energy dependent component is $$w_0 = \frac{-0.5}{\sigma_{g_x^t}+\sigma_{x,s_x^t,0}}. \quad (13)$$

This illustrates that if $\sigma_{g_x^t}$ is large, then $w_0$ will be small and the influence of the energy dependent component will be small.

In some implementations, the gain estimator 230 updates the conditional prior distributions on the dynamic parameters between frames.

In some implementations, the gain estimator 230 can determine the occlusion condition prior for frame t+1 by multiplying the posterior distribution by the occlusion transitional matrix:

$$P(o^{t+1}\mid y_{0:t}) = \sum_{o^t} P(o^t\mid y_{0:t})P(o^{t+1}\mid o^t). \quad (14)$$

In some implementations, the gain estimator 230 can determine the conditional gain priors using:

$$P(g^{t+1}\mid y_{0:t}) = \int_{g^t} P(g^t\mid y_{0:t})P(g^{t+1}\mid g^t) \propto \int_{g^t} P(y^t\mid g^t, y_{0:t-1})P(g^t\mid y_{0:t-1})P(g^{t+1}\mid g^t). \quad (15)$$

In some implementations, the gain dynamic distribution $P(g^{t+1}|g^t)$, (which may describe how the gain for each model evolves) is parameterized as:

$$P(g_{t+1}|g^t)\alpha N(g^{t+1};g^t;\Sigma_{RW})N(g^{t+1};\mu_{SNR},\Sigma_{SNR}). \quad (16)$$

Figure 7:
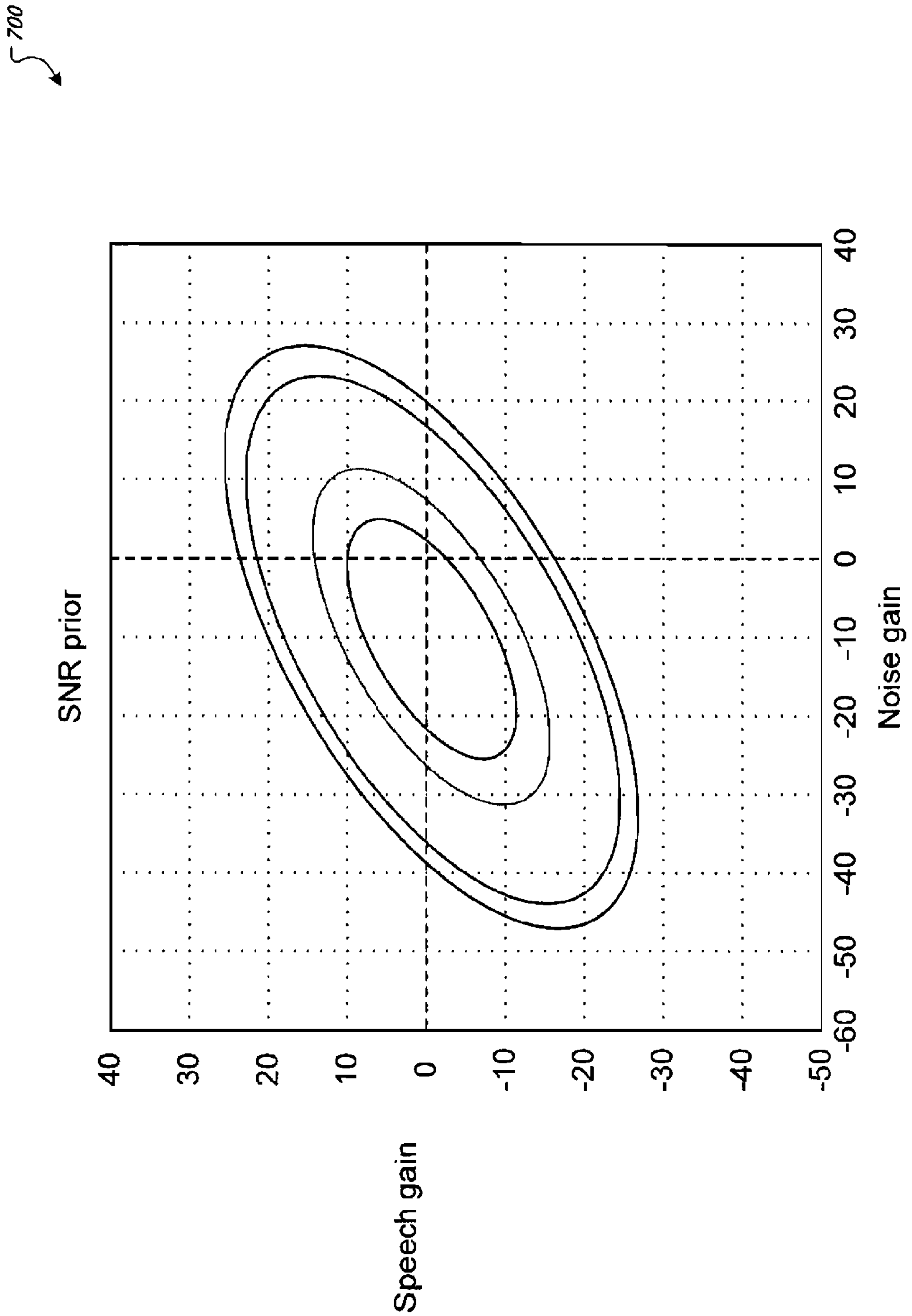
FIG. 7 is a graph of an example SNR prior distribution.
Figure 8A:
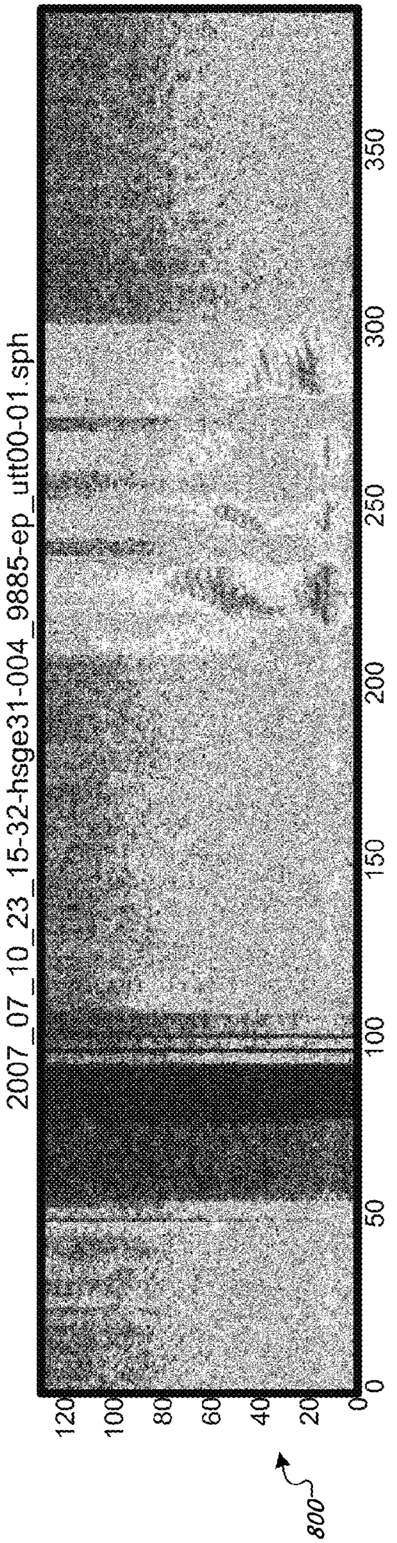
FIGS. 8A-G are examples of speech endpointing using a switching dynamic noise adaptation (DySANA) model.
Figure 8B:
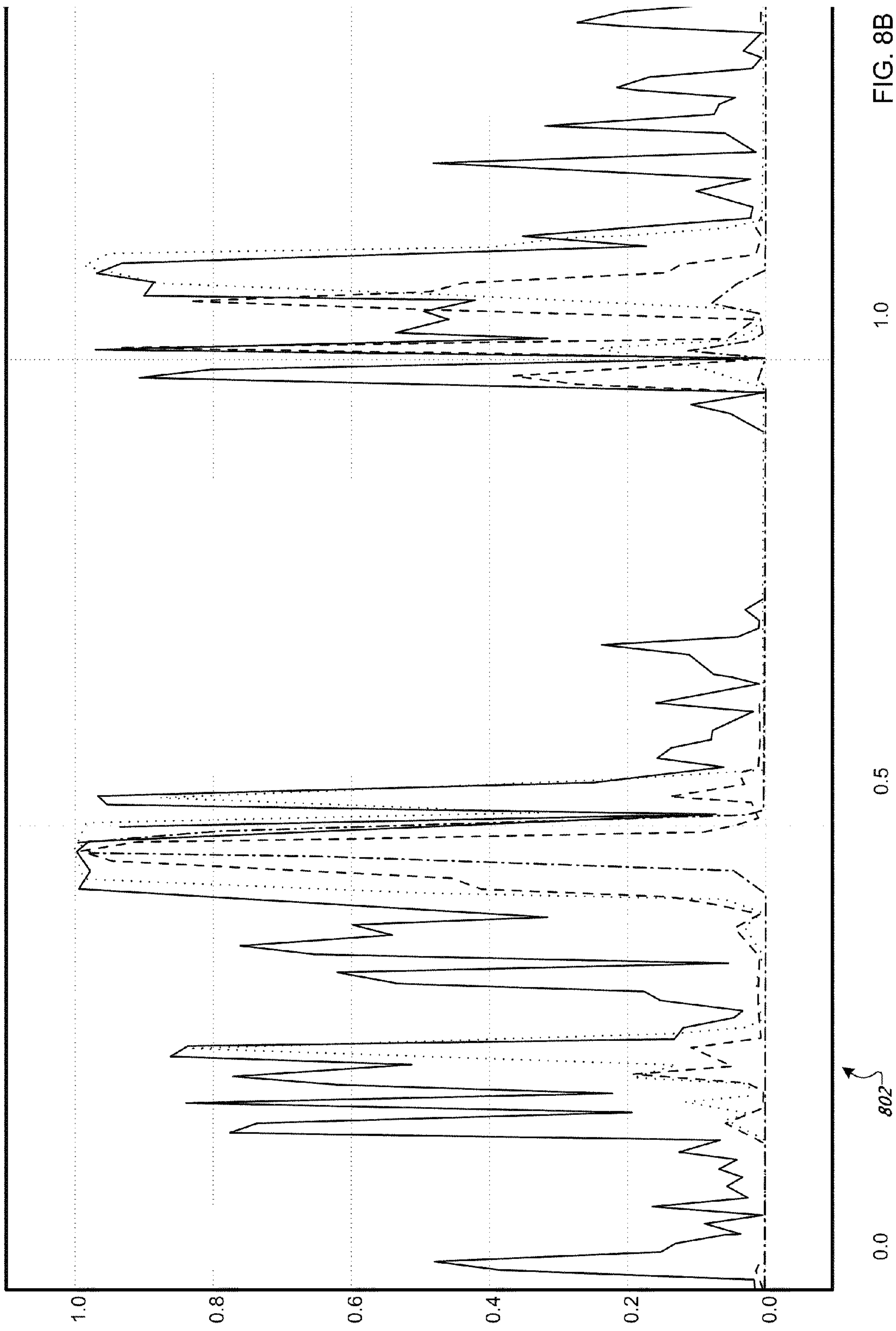
Figure 8C:
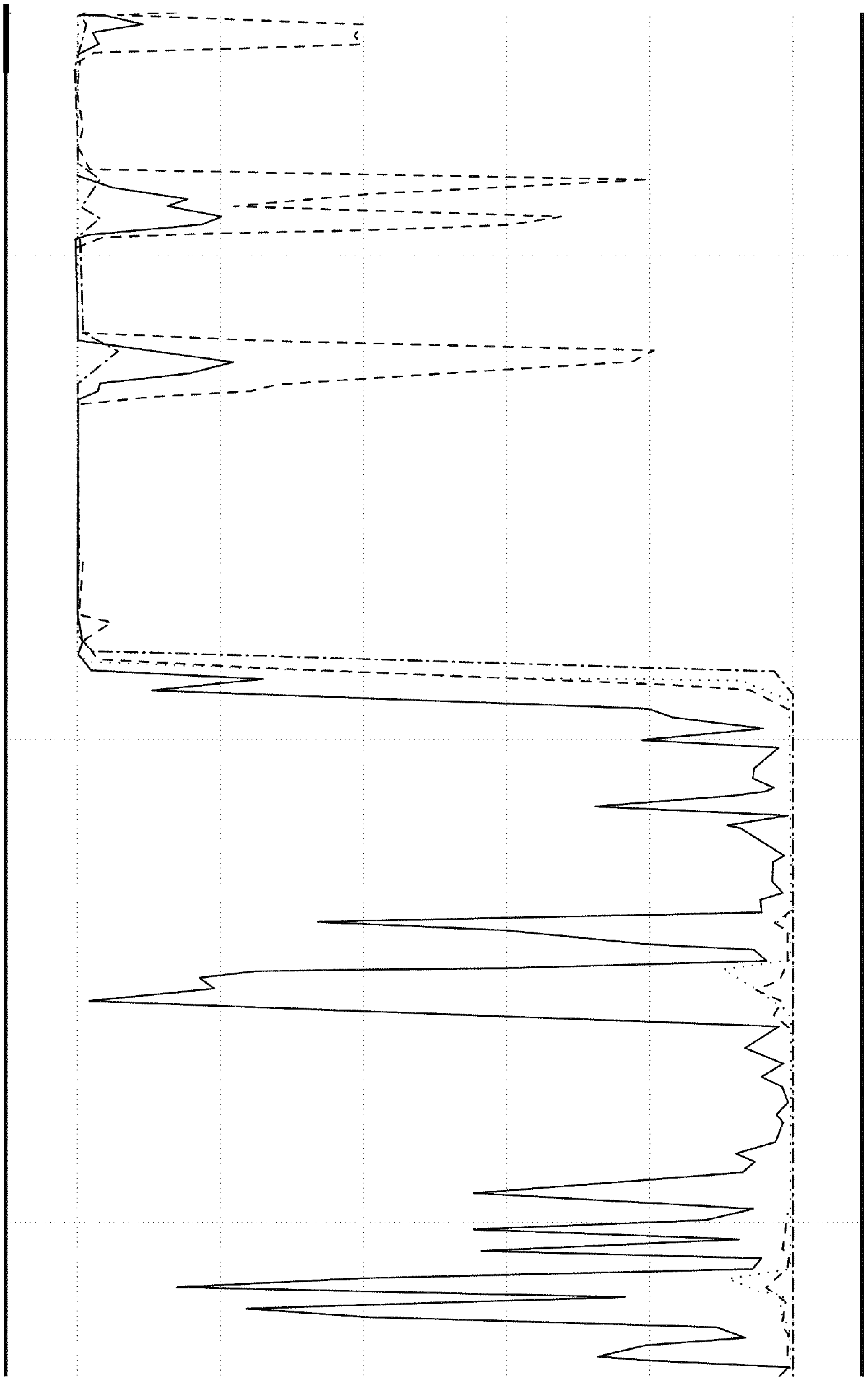
Figure 8D:
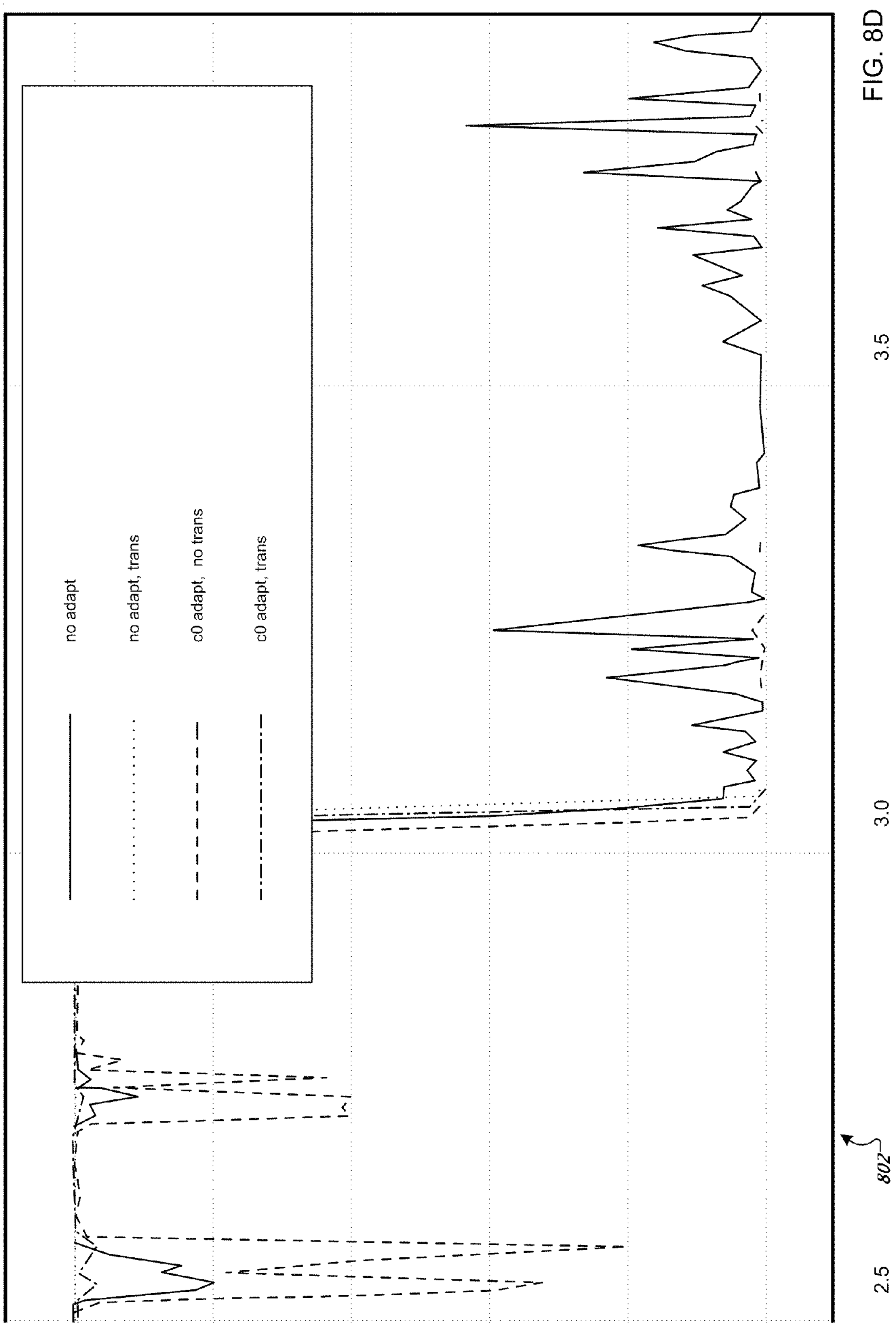
Figure 8E:
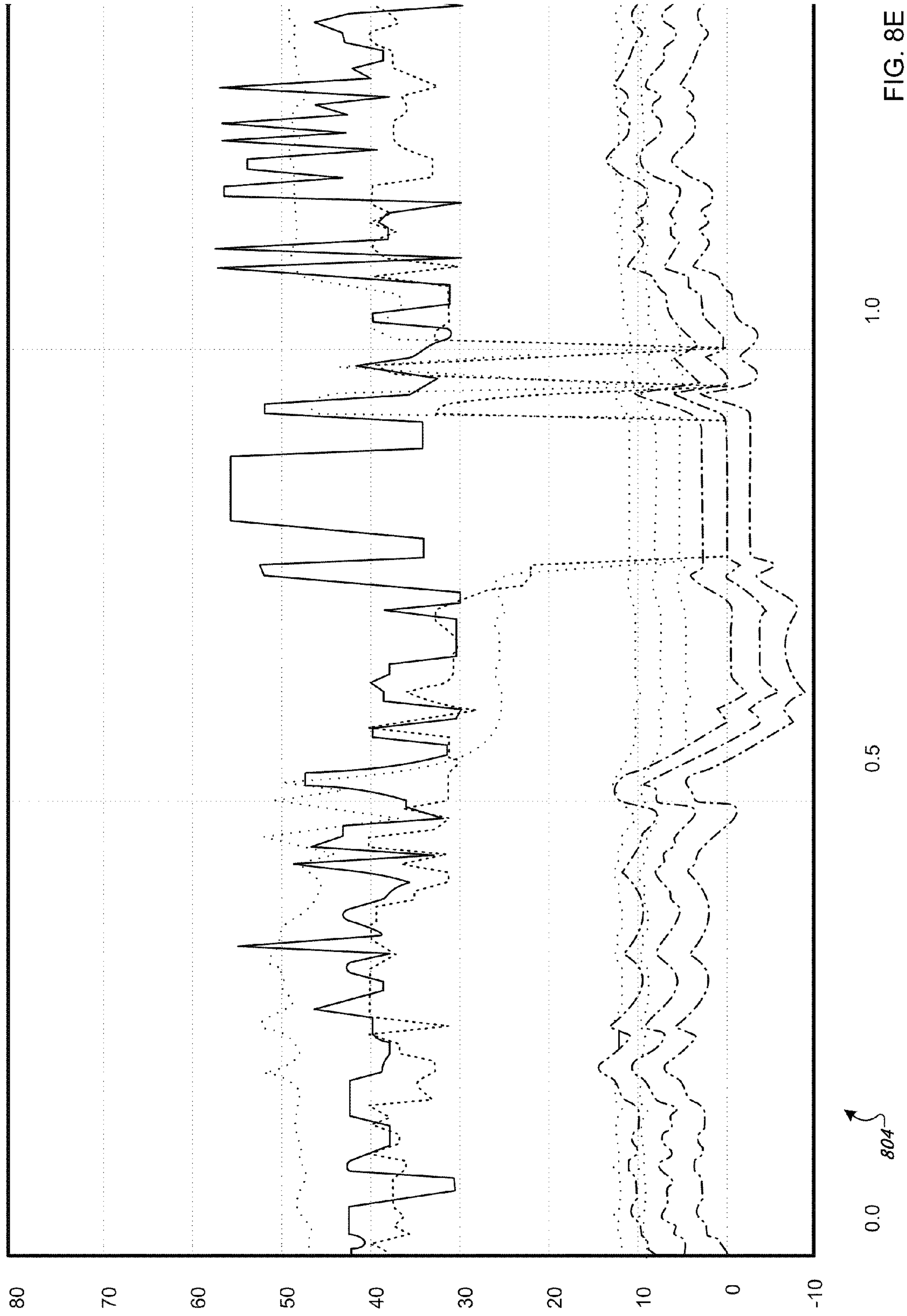
Figure 8F:
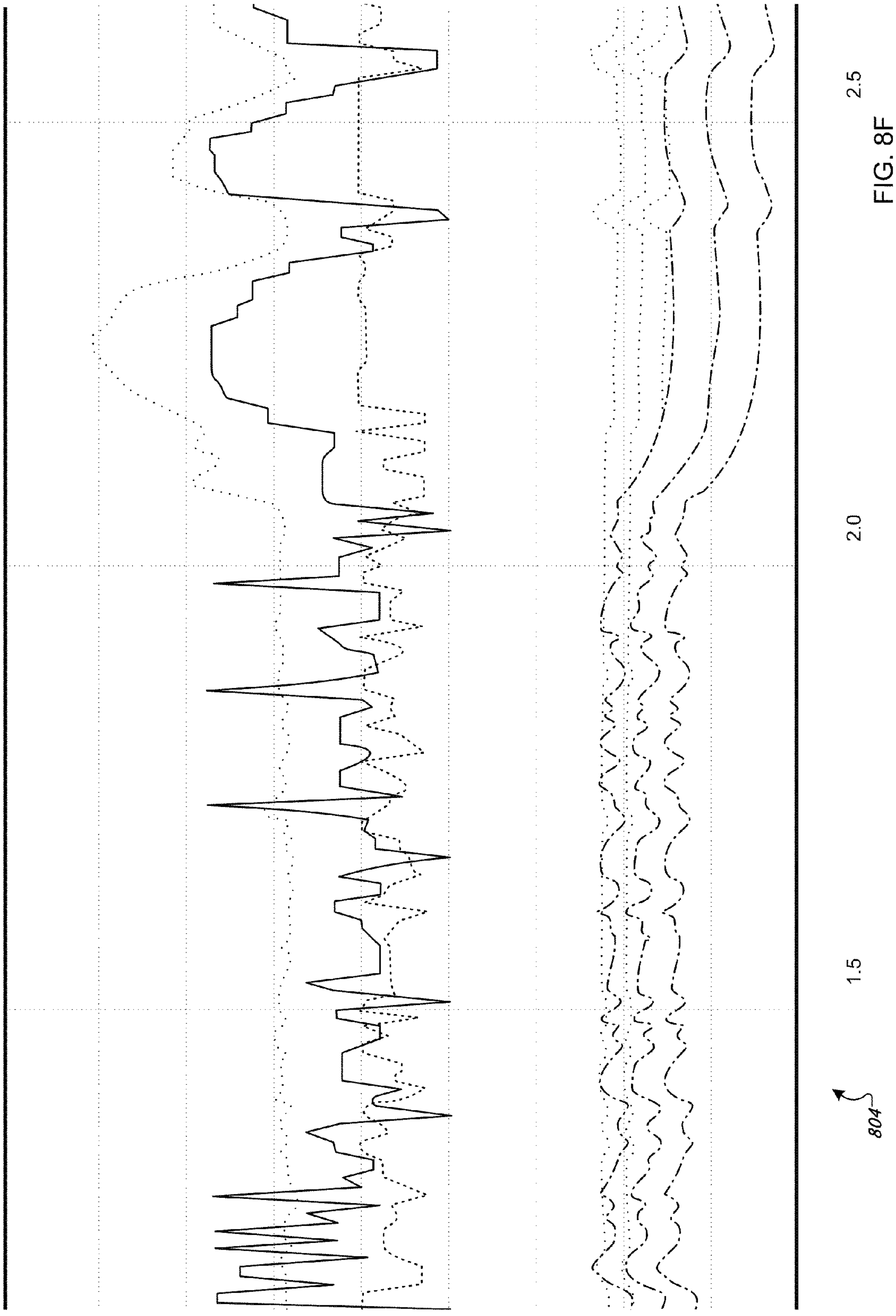
Figure 8G:
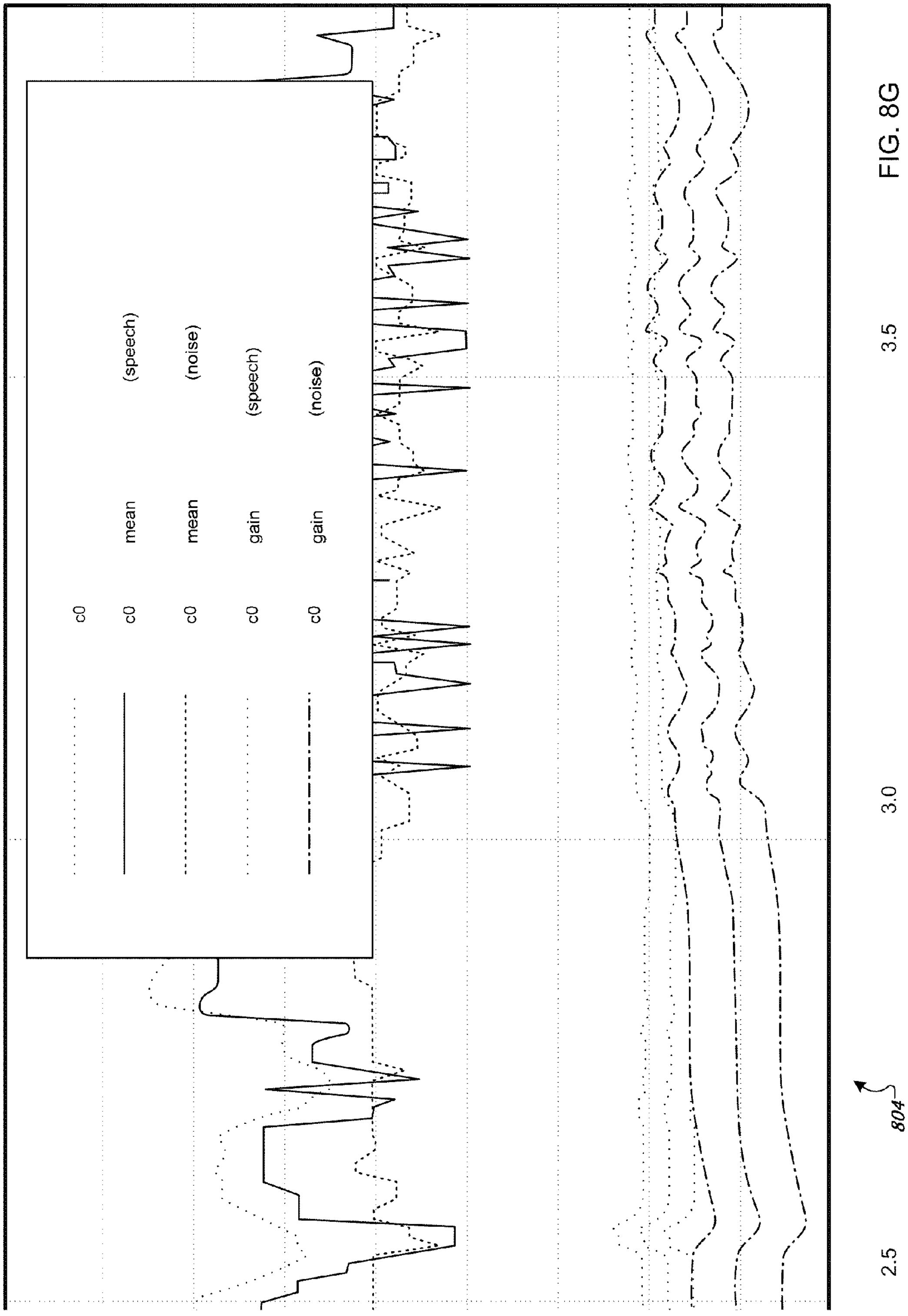
Figure 10:
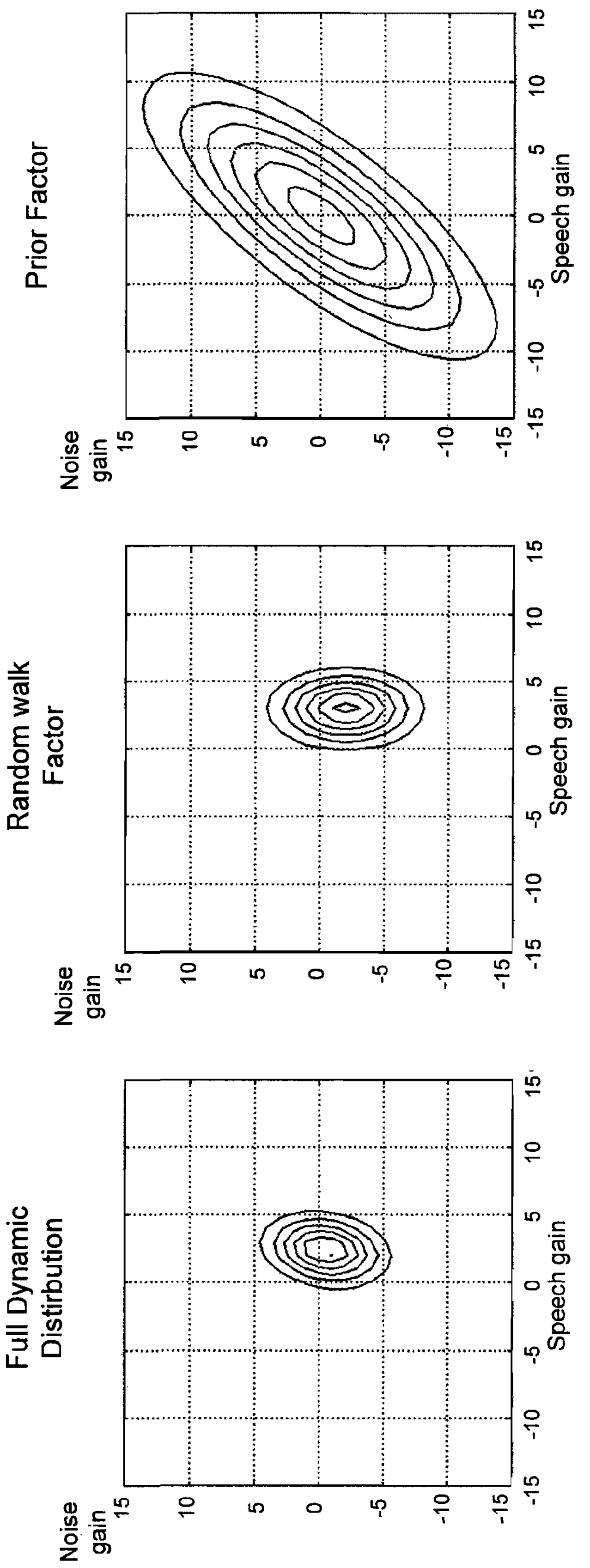
FIG. 10 is a diagram of an exemplary full dynamic distribution composed of a random walk component and a signal-to-noise ratio prior component.

This parameterization may compactly specify the dynamic behavior of the gain estimates, for example, generated by the gain estimator 230. In some implementations, it is a product of two factors, i.e. the random walk factor $N(g^{t+1}; g^t; \Sigma_{RW})$ which constrains how much the gains can change between time steps, and the SNR prior factor $N(g^{t+1}; \mu_{SNR}, \Sigma_{SNR})$ which is shown in FIG. 7. FIG. 10 is a diagram of an exemplary dynamic distribution that can be composed of a random walk component and an SNR prior component. In some implementations, $\Sigma_{SNR}$ is a full covariance matrix that has the dual role of constraining the range of both the speech and noise gain, and constraining the relative values that speech and noise gains. This factor can be referred to as the Signal to Noise Ratio (SNR) prior. An affect of the SNR prior is that the model will adjust the speech gain, even if only noise is observed, e.g. the speech gain will be increased if the noise gain is increased. This may improve performance since it captures the Lombard effect which is the tendency of a human speaker to increase his or her vocal intensity in the presence of noise.

In some implementations, the Minimum Mean Squared Error (MMSE) estimate may be used in computing the conditional prior $P(g^{t+1}|y_{0:t})$:

$$P(g^{t+1}\mid y_{0:t}) \propto \int_{g^t}\sum_{s_t}\sum_{o^t} P(y^t\mid g^t, s^t, o^t, y_{0:t-1}) P(s^t)P(g^t\mid y_{0:t-1})P(o^t\mid y_{0:t-1})P(g^{t+1}\mid g^t) \quad (17)$$

As described above, a likelihood term in equation 17 is a mixture of Gaussians, so the full conditional prior of $g^{t+1}$ has a distribution with $|s_x|+|s_n|$ modes. This may require a significant amount of computing power to propagate. In some implementations, the mixture of Gaussians may be approximated with a single Gaussian on the most probable mode of full distribution. For example, equation 5 given above may be used to approximate the mixture of Gaussians.

In some implementations, the most probable mode of the full distribution occurs in maximum a posterior (MAP) settings of $s^t$ and $o^t$ which are $\hat{s}^t$ and $\hat{o}^t$ respectively. If the MAP setting has $\hat{o}^t=1$, i.e. the frame is likely to contain speech, then $$\begin{aligned} P(g^{t+1}\mid y_{0:t}) &\propto \int_{g^t} P(y^t\mid g^t, y_{0:t-1})P(g^t\mid y_{0:t-1}) P(g^{t+1}\mid g^t) \\ &= \int_{g^t} N\left(y^t; \mu_{x,s_x^t} + \begin{bmatrix}0\\ g_x^t\end{bmatrix}, \sum_{x,s_x^t}\right) N\left(g^t; \mu_{g^t}, \sum_{g^t}\right) P(g^{t+1}\mid g^t) \\ &\propto \int_{g^t} N\left(g^t; \mu_{l_p}, \sum_{l_p}\right) P(g^{t+1}\mid g^t) \text{ where} \end{aligned} \quad (18)$$

$$\mu_{l_p} = \begin{bmatrix}\mu_{lp,x}\\ \mu_{lp,n}\end{bmatrix} = \sum_{l_p}\left(\sum_{g^t}^{-1}\mu_{g^t} + \begin{bmatrix}1\\0\end{bmatrix}\frac{y_0^t-\mu_{x,\hat{s}_x^t,0}}{\sigma_{x,\hat{s}_x^t,0}}\right); \quad (19)$$

$$\sum_{l_p} = \left(\sum_{g^t}^{-1} + \begin{bmatrix}1 & 0\\ 0 & 0\end{bmatrix}\frac{1}{\sigma_{x,\hat{s}_x^t,0}}\right)^{-1}; \quad (20)$$

are the mean and variance of the gain component of product of the conditional gain prior and the observation likelihood.

Under the MAP approximation, only a single Gaussian Mixture component is considered when updating the gains. Hence if the occlusion variable $\hat{o}^t=1$ the speech component $\mu_{lp,x}$ of $\mu_{lp}$ is a weighted sum of the conditional gain prior $\mu_{g^t}$ and an error term based on the observation $(y_0^t-\mu_{x,\hat{s}_x^t,0})$. The observation $y^t$ may not be present in the update of the noise component $\mu_{lp,n}$ of $\mu_{lp}$. The influence of a speech observation on the noise gain will come through the SNR prior when the SNR dynamic distribution is taken into account.

If an additive observation model is used instead of an occlusion observation model, then the an error term based on the observation $(y_0^t-\mu_{x,\hat{s}_x^t,0})$ may be present in update of all parameters. In this case, the relative weight given to the error term may depend on likelihood covariance matrix.

Under the MMSE approximation, the update of $\mu_{lp}$ and $\Sigma_{lp}$ will be a weighted sum of components, where the weights are proportional to the model fit of each component.

The influence of the SNR dynamic distribution may be taken into account next $$\begin{aligned} P(g^{t+1} \mid y_{0:t}) &\propto \int_{g^t} N\left(g^t; \mu_{lp}, \sum_{lp}\right) P(g^{t+1} \mid g^t) \\ &\propto N\left(g^{t+1}; \mu_{SNR}, \sum_{SNR}\right) \int_{g^t} N\left(g^t; \mu_{lp}, \sum_{lp}\right) N\left(g^{t+1}; g^t, \sum_{RW}\right) \\ &\propto N\left(g^{t+1}; \mu_{SNR}, \sum_{SNR}\right) N\left(g^{t+1}; \mu_{lp}, \sum_{lp} + \sum_{RW}\right) \\ &\propto N\left(g^{t+1}; \mu_{g^{t+1}}, \sum_{g^{t+1}}\right), \text{ where} \end{aligned} \tag{21}$$

$$\mu_{g^{t+1}} = W\mu_{lp} + (I-W)\mu_{SNR}; \tag{22}$$

$$W = \sum_{SNR}\left(\sum_{SNR} + \sum_{RW} + \sum_{lp}\right)^{-1}; \text{ and} \tag{23}$$

$$\sum_{g^{t+1}} = \sum_{SNR}\left(\sum_{SNR} + \sum_{RW} + \sum_{lp}\right)^{-1}\left(\sum_{RW} + \sum_{lp}\right) = W\left(\sum_{RW} + \sum_{lp}\right). \tag{24}$$

In this example, the propagated mean $\mu_{g^{t+1}}$ is a weighted sum of the conditional prior gain from the last observation (i.e., $\mu_{g^t}$), the SNR prior gain (i.e., $\mu_{SNR}$), and the gain estimate based on the observation (i.e., $y_0^t-\mu_{x,\hat{s}_x^t,0}$). Because in some implementations observing speech may give no new information about the instantaneous noise gain, $\mu_{lp}$ and $\Sigma_{lp}$ reduce the prior values for the noise gain. This may cause the speech gain to drift towards the prior $\mu_{g_x}$ during a long sequence of noise observations. The variance ratio, W, can control how strongly the prior mean attracts the prior (see 22).

In some implementations, $\Sigma_{SNR}$ is a full matrix, and hence W is a full matrix $$W = \begin{bmatrix} w_{1,1} & w_{1,2} \\ w_{2,1} & w_{2,2} \end{bmatrix}. \tag{25}$$

In this case, the observation of speech can influence the gain estimate for noise, and vice versa, through the off-diagonal terms of W. The noise component of equation 22 is $$\mu_{g^{t+1},n} = w_{2,1}\mu_{lp,x} + w_{2,2}\mu_{lp,n} + (1-w_{2,1})\mu_{SNR,x} + (1-w_{2,2})\mu_{SNR,n}. \tag{26}$$

For the example discussed above, for the case where speech is observed, $\mu_{lp,x}$ will contain the term $(y_0^t-\mu_{x,\hat{s}_x^t,0})$ from the observation, but $\mu_{lp,n}$ may not. This allows the observation to influence the gain for the noise model $\mu_{g^{t+1},n}$, even when the noise is not observed.

The derivation for the case where $\hat{o}^t=0$ is similar, except $\mu_{lp}$ and $\Sigma_{lp}$ may be defined differently, such as $$\mu_{lp} = \sum_{lp}\left(\sum_{g^t}^{-1} \mu_{g^t} + \begin{bmatrix} 0 \\ 1 \end{bmatrix} \frac{y_0^t - \mu_{n,\hat{s}_n^t,0}}{\sigma_{n,\hat{s}_n^t,0}}\right) \text{ and} \tag{27}$$

$$\sum_{lp} = \left(\sum_{g^t}^{-1} + \begin{bmatrix} 0 & 0 \\ 0 & 1 \end{bmatrix} \frac{1}{\sigma_{n,\hat{s}_n^t,0}}\right)^{-1}. \tag{28}$$

FIG. 4A and FIGS. 8A-G show examples of the adaptation in action. In some implementations, output by the speech model is compared to speech posteriors without adaptation, as well as the output when the gain adaptations or transition constraints of the model are not used.

Figure 3:
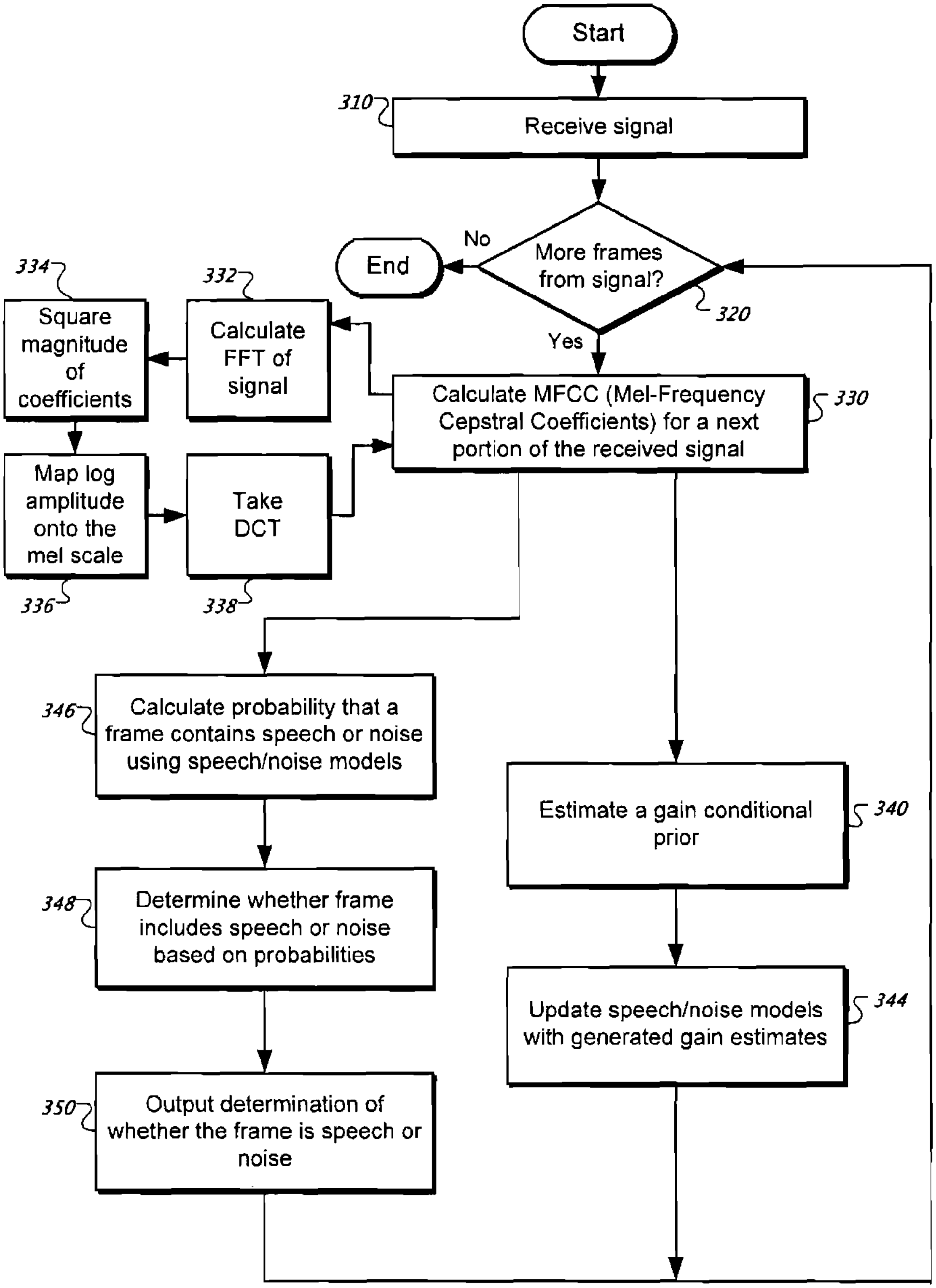
FIG. 3 is a flowchart showing an example method of determining whether a frame includes speech or noise.

FIG. 3 is a flowchart showing an example method of determining whether a frame includes speech or noise. The example method may be performed, for example, by the systems 100 or 200 and for clarity of presentation, the description that follows uses these systems as the basis for an example. However, another system, or combination of systems, may be used to perform the method 300.

In box 310, a signal is received. For example, a cell phone can transmit the audio signal 106 to a speech recognition system 104, which receives the audio signal. In some implementations, the signal 106 is digitized (e.g., using an analog-to-digital converter) if it is received as an analog signal. The digital signal may be divided into multiple frames for processing by the each detector 108 within the speech recognition system 104.

In box 320, a determination may be made whether unprocessed frames exist. For example, the speech recognition system 104 can determine whether the audio signal is still being received. If speech recognition system 104 no longer detects the audio signal, the method 300 can end. Otherwise, the method 300 can proceed to box 330.

In box 330, MFCC's may be calculated for a next portion of the received signal. For example, the speech detector 202 can access a digitized frame of the audio signal 204. The signal feature calculator (SFC) 212 can calculate the FFT of the frame as shown in box 332. The SFC can square the magnitude of coefficients resulting from the FFT, compute the log of the amplitudes and map a log of the amplitudes onto the mel scale as shown in boxes 334 and 336, respectively. Next, the SFC may take the discrete cosine transform (DCT) as previously described and illustrated in box 338.

Next, in some implementations, the method 300 can proceed to execute a parallel sequence indicated by two branches shown in FIG. 3. In one branch starting with box 340, the method 300 describes the updating of models used to determine whether future examined signal portions are speech or noise. In the other branch starting with box 346, an instant signal portion may be examined to determine whether the portion includes speech or noise.

In box 340, a gain condition prior is estimated. In some implementations there are three sources of information in the update of the estimate of the gain conditional prior. For example, these sources can include the gain conditional prior from a previous time step, an observation likelihood, and an SNR dynamic distribution. In some implementations, these correspond to the arrows in FIG. 6.

There may be a three-way weighting of the relative influences of these sources of information. First, if no observation of, for example, the speech signal has been observed for a long time, then the variance of the gain component of conditional prior may be large for the speech gain, and that component may have a small weight when compared to the gain-independent component when computing the observation likelihood. The weight of the observation likelihood may be large for updating the speech model if the observation is determined to be speech (e.g., if the observation closely matches the speech model). Similarly, the weight of the SNR prior is reflected by the covariance matrix. For example, the weighting between the gain variant components and gain dependent components can be determined by the variance of the gain dependent component i.e., $\sigma_{g_x{}^t}$. If this variance is large, then the model can disregard the gain variant components. The weight given to SNR prior versus the observational evidence up to time T is given by W.

In updating the model(s), posterior probability weights may be generated from the MFCC components. The weight can be based on the components that are independent of gain, or the weights that are dependent of gain, or a combination of both, as indicated by the box 340. For example, MFCC components C1-C12 may be invariant to the gain of the signal included in a frame analyzed by the speech detector, and MFCC component C0 or an explicit energy dependent component can be gain dependent. The relative influence of the gain invariant and gain dependent components depends on the variance of the respective components. Posterior probability weights based upon these gain dependent and gain invariant components can be transmitted to the gain estimator for use in predicting updated gain estimates for the models as indicated by the transmission of information 238 in FIG. 2.

In box 344, the speech/noise models are updated with the new gain estimates. For example, the new gain estimates can be transmitted from the gain estimator 230 to the classifier 222 for integration into the Gaussian mixture models 224 and 226. The classifier 222 may use the updated models for future analysis of received frames.

At the same time the models are being updated, a selected frame also may be analyzed according to some implementations. In the second branch previously mentioned, a probability that a frame contains speech or noise may be calculated using the speech/noise models as indicate by box 346. For example, the classifier 222 can calculate the probability that a frame includes speech a probability that a frame includes noise using the equations described in association with FIG. 2.

In box 348, the classifier 222 can classify the frame as speech or noise based on the determined probabilities resulting from the calculations of box 346. For example, if the probability that the frame is noise is higher than the probability that the frame is speech, the frame is classified as including noise.

In box 350, an indication whether the frame is speech or noise is output. For example, the speech detector can output the indication to the speech decoder 110. The speech decoder may only attempt to decode frames that are associated with a speech indicator and may ignore frames associated with a noise indicator. This may decrease computational requirements of the speech recognition system 104 and increase accuracy of speech decoding because frames that are likely noise are not sent to the decoder 110.

After boxes 350 and 344, the method 300 can return to box 320 where a determination is made whether more frames are available for analysis. If more frames are available, the method may repeat as previously described, else the method 300 can end.

Figure 4B:
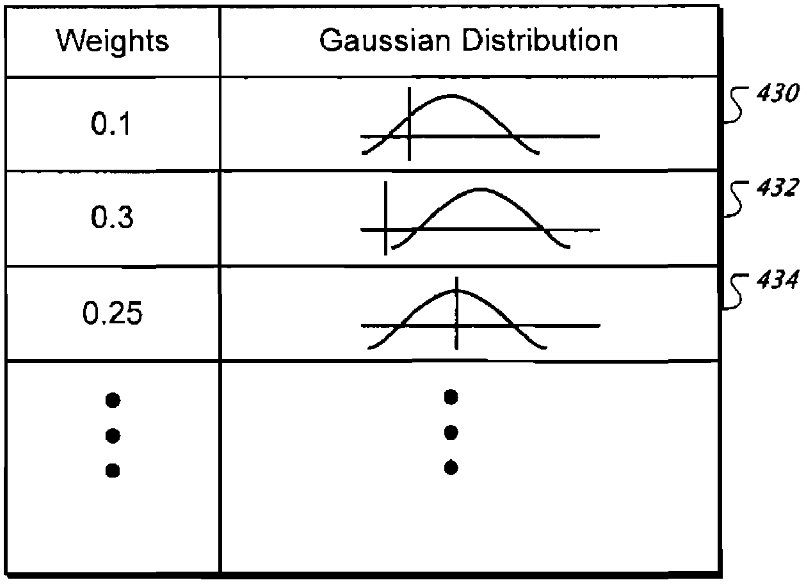
Figure 4C:
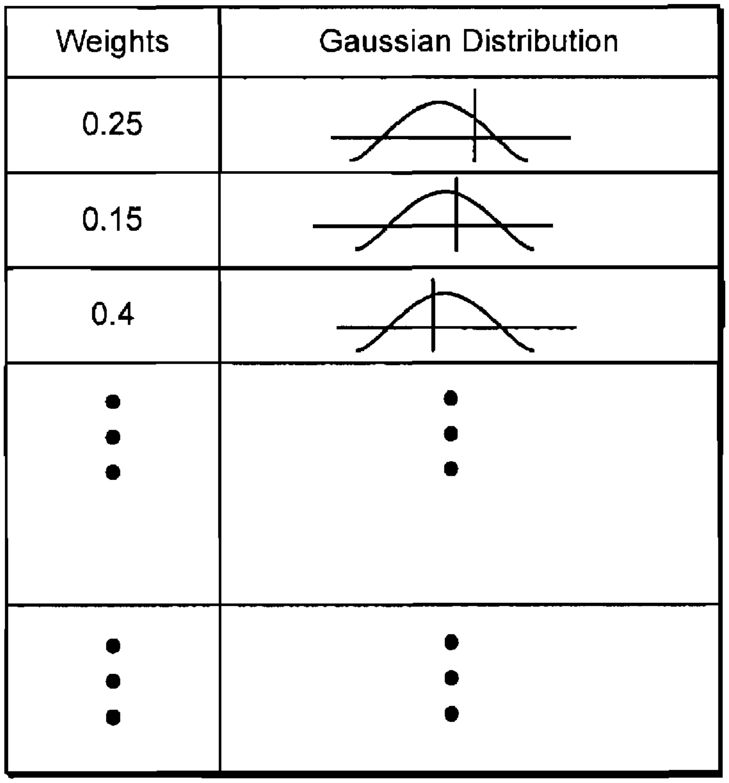

FIGS. 4A-4C are diagrams of examples illustrating the updating and use of the noise/speech models. FIG. 4A is an example implementation of a speech (and/or noise) model, where the model is implemented as a hybrid extended Kalman filter and hidden marker model (HMM) that operates as a Bayesian network and as previously described in association with the models 224, 226 of FIG. 2.

FIGS. 4B and 4C illustrate that in some implementations the speech and noise models can include multiple Gaussian distributions each having a weight that indicates the how much influence the associated distribution has in the calculation of whether a selected portion of a signal is noise and/or speech.

In some implementations, each Gaussian is a Multivariate Gaussian, i.e., it has a vector of means, and a Covariance matrix.

FIG. 4B shows an example table that includes components of a speech model. The table has a column of n (i.e., some number) Gaussian distributions and a column or vector of weights where the weights of each component vector also may be referred to as a mixture-priors P(s), each of which is associated with a particular Gaussian distribution. In some implementations, each of the Gaussian distributions is associated with a particular feature extracted from a portion of the signal. For example, a Gaussian distribution 430 may be associated with the MFCC component C0, a Gaussian distribution 432 may be associate with the MFCC component C1, a Gaussian distribution 434 may be associated with MFCC component C2, etc.

In some implementations, the speech model may rely on certain Gaussian distributions more heavily in a determination of whether a signal portion is speech. For example, a weight of 0.3 is associated with the Gaussian distribution 432 and a weight of 0.1 is is associated with the Gaussian distribution 430. This may indicate that a similarity of a first signal feature to the Gaussian 432 is more important in the characterization of whether a signal is classified as speech than whether a second signal feature is similar to the Gaussian distribution 430.

FIG. 4C shows an example table that includes Gaussian and associated weights used to calculate the probability a signal portion is noise according to one implementation. The example table of FIG. 4C may be substantially similar to the previously described example table of FIG. 4B.

Figure 5A:
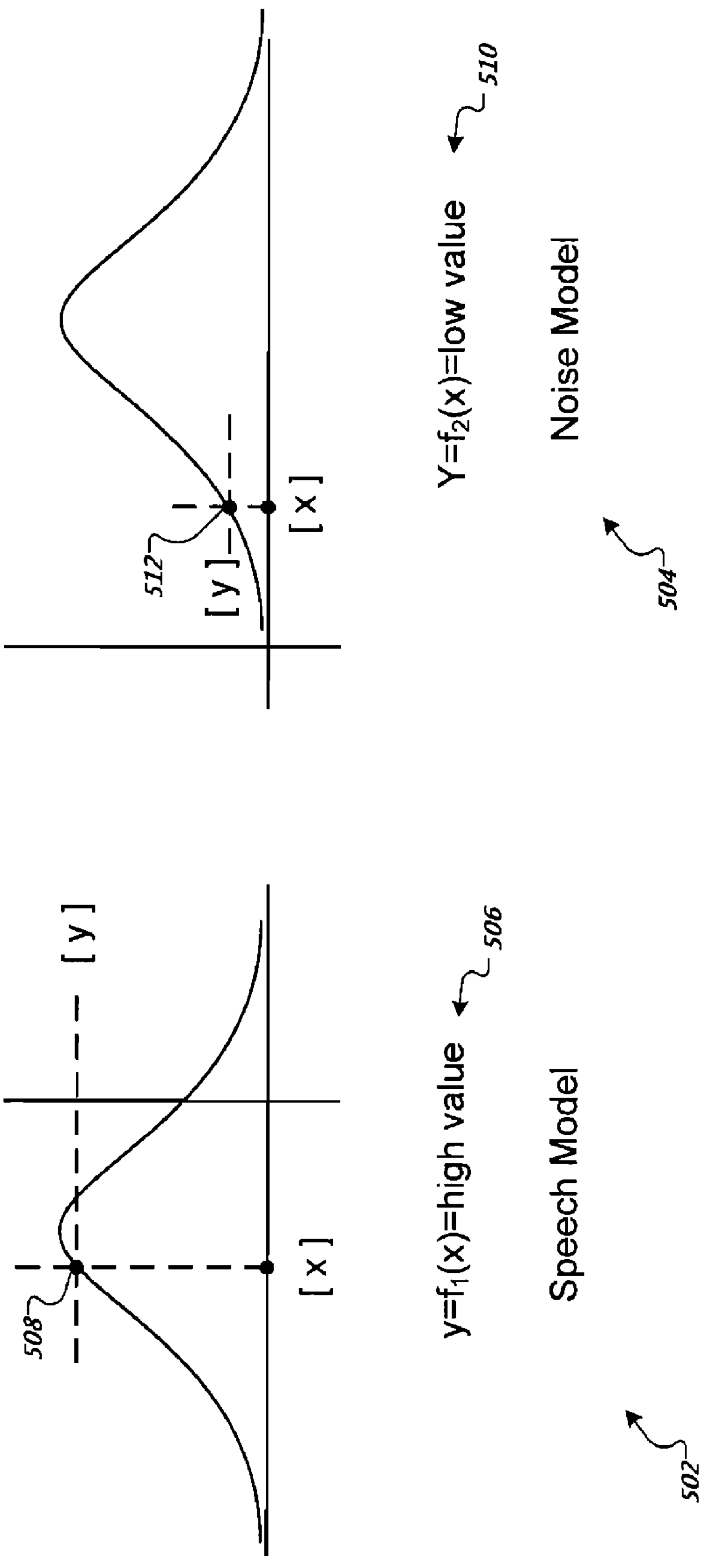
FIGS. 5A and 5B show graphs of two example Gaussian distributions and an example of how gain components of a model are estimated, respectively.

FIG. 5A shows graphs of two example Gaussian distributions. An example Gaussian distribution 502 may be included in a speech model and an example Gaussian distribution 504 may be included in a noise model. The Gaussian distribution 502 may be expressed using a function 506. In some implementations, one or more features can be extracted from a portion of a received audio signal and input into the function 506. The output of the function may indicate a probability that the input feature should be classified as speech.

For example, the input may be a MFCC component extracted from a signal frame. The classifier 222 can input the MFCC value into the function 506. In some implementations, the closer the output of the function is to the mean of the Gaussian distribution 502, the higher the probability that the MFCC component is associated with speech. In the example shown in FIG. 5A, the output $P(y^t|s^t)$ 508 of the function 506 is close to the mean of the Gaussian 502, which indicates that the MFCC component as a high probability that it is associated with speech according to this implementation.

In some implementations, and the classifier 222 can input the same MFCC value into a function 510 associated with a Gaussian distribution 504 for a noise model. In this example, the output $P(y^t|s^t)$ 512 of the function 510 is not close to the mean, but is instead a few standard deviations from the mean indicating that the MFCC component has a low probability that it is associated with noise.

Figure 5B:
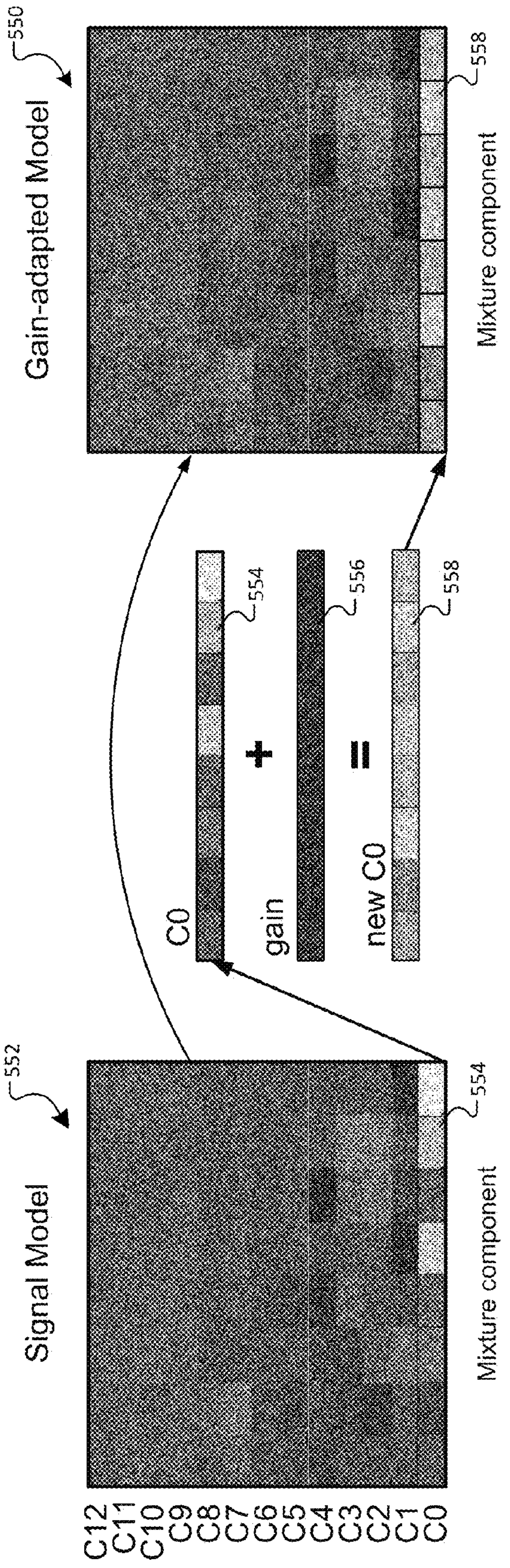

FIG. 5B shows an example of how a gain-adapted model 550 is generated. In one implementation, an original model 552 includes several Gaussians, where each Gaussian is indicated by a column of a matrix for the model 552. Each row in the matrix may correspond to a MFCC component. For example, a bottom row 554 may include values that correspond to the gain-dependent MFCC component C0. The classifier 222, for example, can combine the C0 components for each of the Gaussians in the original model with gain values observed in a current signal frame 556 to generate new gain estimates 558 that are incorporated into the gain-adapted model 550.

In some implementations, the probability that an observed frame is speech can be calculated using:

$$P(o^t = 1 \mid y^{0:t}) \propto P(o^{t-1} = 1 \mid y^{0:t-1}) P(o^t \mid o^{t-1}) \sum_s P(s) P(y^t \mid s), \tag{29}$$

where $$P(y^t \mid s) = \begin{cases} N\left(y_0^t; \mu_{x,s,0} + \mu_{g_x^t}, \sigma_{x,s,0} + \sigma_{g_x^t}\right), & \text{gain-dependent} \\ \prod_{d=1}^{D} N(y_d^t; \mu_{x,s,d} \sigma_{x,s,d}), & \text{gain-invariant} \end{cases} \tag{30}$$

Figure 6:
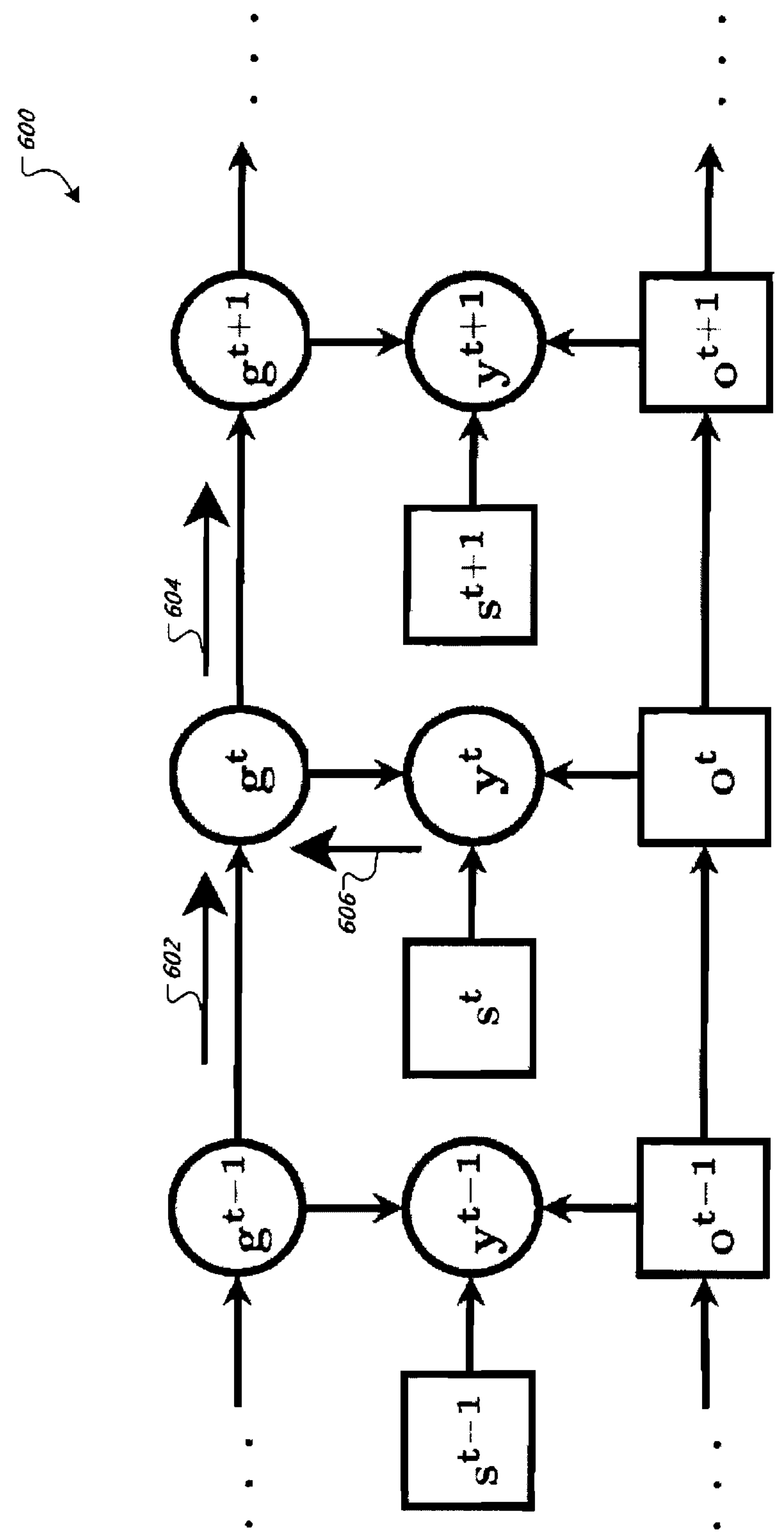
FIG. 6 shows a diagram of an example of gain parameter propagation in a speech/noise model.

FIG. 6 shows a diagram of an example of gain parameter propagation in a speech/noise model 600. In some implementations, the model 600 is used to calculate an occlusion prior as described earlier in association with equation 14.

The model 600 can also calculate new gain parameters $P(g^{t+1}|y^{0:t})$ for the next time period given the current gain observation are computed based on a probability of the last gain values given the last gain observation 602, i.e., $P(g^t|y^{0:t-1})$ and a probability of the gain of current observations $P(y^t)$ of the audio signal 606. The estimation of the gain condition prior may be implemented using equation 15 above.

In another implementation, the model 600 can approximate the gain conditional prior using $$P(g^{t+1}|g^t) \alpha N(g^{t+1}; g^t, \Sigma_{RW}) N(g^{t+1}; \mu_{SNR}, \Sigma_{SNR}) \tag{31;}$$

to define the gain dynamics as described earlier in association with equations 18 to 24. In this approximation, the implementation is a random walk model and is constrained by a prior SNR (signal-to-noise ratio) distribution 604.

FIG. 7 is a graph 700 of an example SNR prior distribution as expressed in equation 16. As mentioned in association with FIG. 6, the SNR prior distribution may constrain the gain estimates used to update the speech and/or noise models. For example, the SNR prior distribution may couple the speech and noise gain to enforce a signal-to-noise ratio (e.g., the SNR prior may facilitate an inference of a speech gain from a noise gain even when speech is not observed). Additionally, the SNR prior distribution and limit maximum/minimum speech and noise levels.

FIGS. 8A-G are examples of speech endpointing using dynamic speech and noise adaptation (DySANA) model previously described. In some implementations tracking the instantaneous SNR of a signal can improve speech endpoint performance. For instance, prior levels built into speech and noise models may be a poor match for outliers in the data set (e.g., signals with high noise where the noise level is comparable to the prior speech level causing a misclassification of frames as speech). Accounting for an instantaneous SNR levels may alleviate this misclassification.

A graph 800 (depicted in FIG. 8A) shows a signal of 1 an audio recording that includes several frames of noise (some of which have a high gain) and a few frames of speech, which occur approximately between 200-300 ms on the graph 800.

A graph 802 (depicted across FIGS. 8B-D) shows a posterior speech probability under an unadapted model and the DySANA model, and under both models when utilizing transition constraints that prevent the system from switching between noise and speech states too quickly.

A graph 804 (depicted across FIGS. 8E-G) shows the observed signal level (C0), the signal and noise levels for each frame under their respective models, and the switching DNA gain estimates. As shown in the example graph 804, the noise level varies through the signal and at some points becomes almost speech-like (e.g., at 0.5 seconds, 1 second, and 1.75 seconds as indicated in the graph 802). The noise gain level may cause the unadapted model to misclassify the noise frames as speech. Applying transition constraints may alleviate the misclassifications of the unadapted model, but the unadapted model may still generate false positives (e.g., at 0.5 and 1 second). Application of the DySANA adaptation may further reduce these errors.

Figure 9:
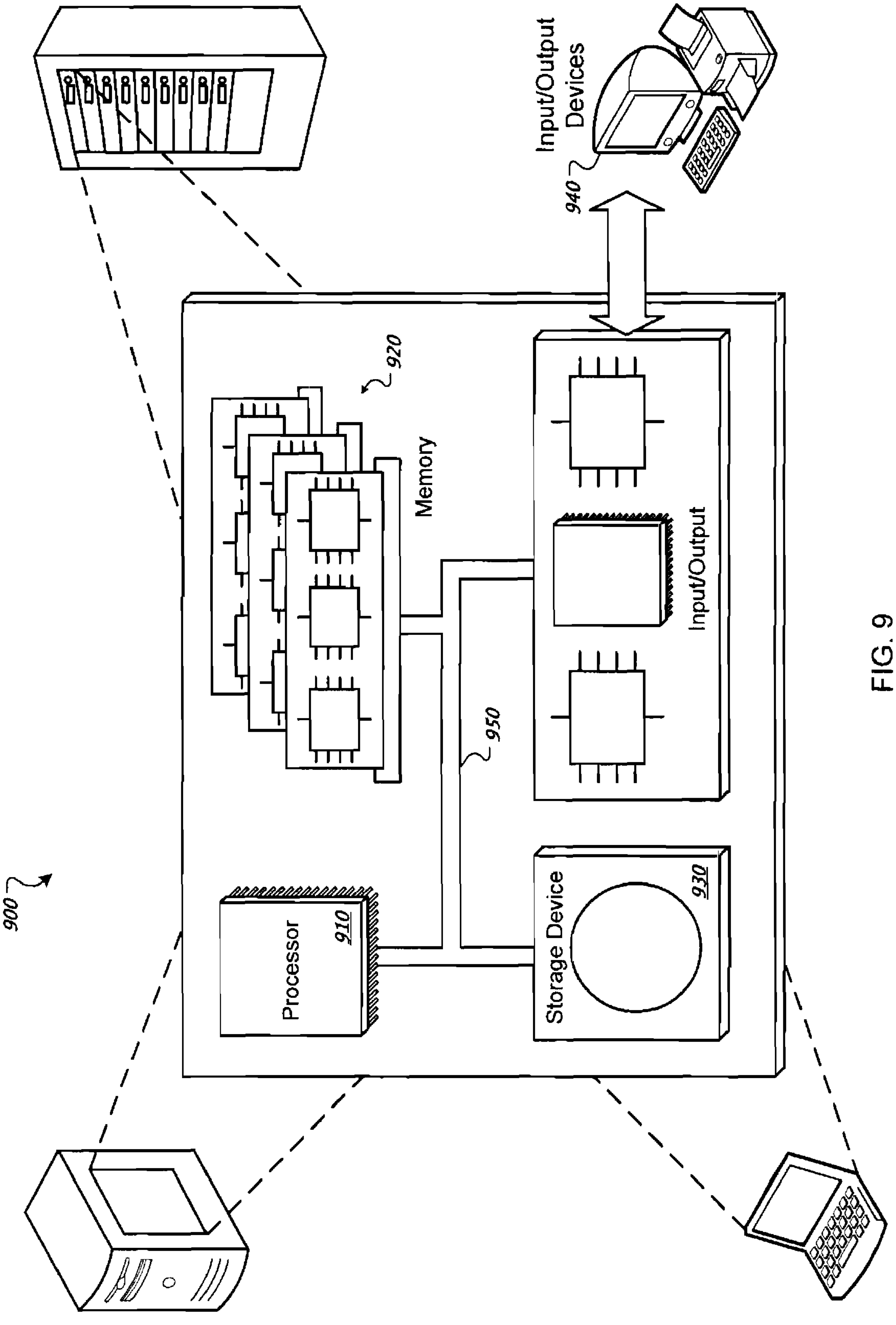
FIG. 9 is an example of a general computing system.

FIG. 9 is a schematic diagram of a computer system 900. The system 900 can be used for the operations described in association with any of the computer-implement methods described previously, according to one implementation. The system 900 is intended to include various forms of digital computers, such as laptops, desktops, workstations, personal digital assistants, servers, blade servers, mainframes, and other appropriate computers.

The system 900 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. The processor may be designed using any of a number of architectures. For example, the processor 910 may be a CISC (Complex Instruction Set Computers) processor, a RISC (Reduced Instruction Set Computer) processor, or a MISC (Minimal Instruction Set Computer) processor.

In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result.

A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In some implementations, the weights described previously are not explicit variables, constants, or other coefficients, but instead are implicit factors that affect a particular component's influence in calculations. In some implementations, gain estimates for the speech and noise models can be determined based on multiple sources, each of which can have more or less influence in a calculation result depending on a state or condition of the source (e.g., whether an analyzed signal appears to fit a noise model could be considered a condition for an observation likelihood component of a calculation to determine an estimated gain for the noise model).

For example, the gain estimator 230 can calculate gain estimates for use in the speech and noise models. The estimates can be based on, for example, three sources the previous gain condition prior, a current observation likelihood (e.g., how well the current observation fits the speech/noise model, and the SNR dynamic distribution. If, for example, the current observation is likely noise based on a close fit of the current observation to the noise model (e.g., low variance), the influence of the current observation likelihood for the noise model is increased, the influence of the previous condition prior for the noise model is decreased, and the gain for the noise is not influence (or is influence to a lower extend) by the SNR dynamic distribution in accordance with the previously described equations. Based on the relative influence of each of these sources, a gain estimate can be calculated and used to update the noise model.

If the current observation fits the noise model (as described above in this example), the current observation likelihood for the speech model may be low (e.g. the current observation has a high variance when compared to the speech model). In this case, the influence of the previous gain conditional prior for the speech model will be greater, and the speech gain will be pushed higher based on the SNR dynamic distribution for the speech model. Based on the relative influence of each of these sources, a gain estimate can be calculated and used to update the speech model.

In another implementation, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Symbols Used in this Document According to One Implementation:

$y^t$ observation vector at time t which may be a vector of MFCC values.

$g^t$ Gain under each model for a particular time t $s^t$ State variable representing the Gaussian component within the Gaussian Mixture Model at time t.

$s_x^t$ State variable representing the Gaussian component within the speech Gaussian Mixture Model at time t.

$s_n^t$ State variable representing the Gaussian component within the noise Gaussian Mixture Model at time t.

$o^t$ Voice activity state variable representing the presence of speech or noise. Also called occlusion state variable.

$P(g^t|y_{0:t-1})$ Conditional prior for gain $g^t$. Takes into account all observations up until time t−1.

$P(o^t|y_{0:t-1})$ Conditional prior for occlusion variable $o^t$. Takes into account all observations up until time t−1.

$P(g^{t+1}|g^t)$ Gain dynamic distribution. Also called SNR dynamic distribution.

$P(o^{t+1}|o^t)$ Transition matrix for occlusion state variable.

P(s) Prior for state s within the noise or speech Gaussian Mixture Model.

$\mu_{n,s_n^t}$ Mean of Gaussian mixture component $s_n$ at time t for the noise model.

$\mu_{n,s_n^t,0}$ Gain dependent mean of Gaussian mixture component $s_n$ at time t for the noise model.

$\mu_{n,s_n^t,1:D}$ Gain invariant vector of means of Gaussian mixture component $s_n$ at time t for the noise model.

$\Sigma_{nms_n^t}$ Covariance matrix of Gaussian mixture component $s_n$ at time t for the noise model.

$\Sigma_{n,s_n^t}$ Gain dependent component of the covariance matrix of Gaussian mixture component $s_n$ at time t for the noise model.

$\Sigma_{n,s_n^t,1:D}$ Gain invariant components of the covariance matrix of Gaussian mixture component $s_n$ at time t for the noise model.

$\mu_{x,s_x^t}$ Mean of Gaussian mixture component $s_x$ at time t for the speech model.

$\mu_{x,s_x^t,0}$ Gain dependent mean of Gaussian mixture component $s_x$ at time t for the speech model.

$\mu_{x,s_x^t,1:D}$ Gain invariant vector of means of Gaussian mixture component $s_x$ at time t for the speech model.

$\Sigma_{x,s_x^t}$ Covariance matrix of Gaussian mixture component $s_x$ at time t for the speech model.

$\sigma_{x,s_x^t,0}$ Gain dependent component of the covariance matrix of Gaussian mixture component $s_x$ at time t for the speech model.

$\Sigma_{x,s_x^t,1:D}$ Gain invariant components of the covariance matrix of Gaussian mixture component $s_x$ at time t for the speech model.

$\mu_{g_x^t}$ Gain of speech model.

$\mu_{g_n^t}$ Gain of noise model.

$\Sigma_{RW}$ Covariance of the random walk factor of the gain dynamic distribution.

$\mu_{SNR}$ mean of the SNR factor of the gain dynamic distribution. Also called the mean of the SNR prior.

$\Sigma_{SNR}$ Covariance of the SNR factor of the gain dynamic distribution. Also called the covariance of the SNR prior.

$\mu_{lp}$ Intermediate result in the gain update. Represents the mean of the product of the conditional prior covariance and the likelihood due to the current observation.

$\Sigma_{lp}$ Intermediate result in the gain update. Represents the covariance of the product of the conditional prior covariance and the likelihood due to the current observation.

W Weight which modifies influence of the SNR prior in the update of the mean and variance of the gains.

What is claimed is:

1. A computer-implemented method comprising:

receiving, at a computer system, an audio signal;

determining, by the computer system, an energy-independent component of a portion of the audio signal associated with a spectral shape of the portion;

determining, by the computer system, an energy-dependent component of the portion associated with a gain level of the portion;

associating, by the computer system, a weight with each Gaussian distribution in a Gaussian mixture model based on a confidence value for estimates that make up the corresponding Gaussian distribution, wherein a speech model or a noise model comprises the Gaussian mixture model;

comparing the energy-independent and energy-dependent components to the speech model;

comparing the energy-independent and energy-dependent components to the noise model; and outputting, by the computer system, an indication whether the portion of the audio signal more closely corresponds to the speech model or to the noise model based on the comparisons.

2. The method of claim 1, wherein the speech and noise models comprise energy-dependent variables and energy-independent variables that are used in the comparison with energy-dependent and energy-independent components of the portion of the audio signal.

3. The method of claim 2, further comprising updating the energy-dependent variables of the speech or noise models with estimated values based on previously observed energy-independent components and energy-dependent components from the portion of the audio signal or from previously analyzed portions of the audio signal.

4. The method of claim 3, wherein the energy-independent variables receive greater weight in a determination of whether the portion of the audio signal is speech or noise if a confidence measure for the estimated energy-dependent variables is low.

5. The method of claim 1, further comprising determining a probability that the portion of the audio signal includes noise or speech.

6. The method of claim 5, wherein the determination of the probability comprises using an extended Kalman filter and a Hidden Markov Model to calculate the probability.

7. The method of claim 1, wherein the confidence value is determined by variance or covariance values associated with the energy-dependent or energy-independent components of the speech or noise model.

8. The method of claim 1, wherein the weight determines how much influence the associated Gaussian distribution exhibits in determining a probability that the portion of the audio signal is speech or noise.

9. The method of claim 1, further comprising updating an estimated energy-dependent component of the speech or noise models based on a previous estimate for the energy-dependent component, an observation likelihood that indicates how much error exists between the noise or speech models and the energy-dependent component currently observed, and a dynamic distribution that limits a range of an updated energy-dependent component or limits a ratio between values of the energy dependent component.

10. The method of claim 9, further comprising increasing an influence of the previous estimate for the energy-dependent component in a calculation of the update to the estimated energy-dependent component if the previous estimate is associated with low variance.

11. The method of claim 9, further comprising increasing an influence of the observation likelihood if the previous estimate is associated with a high variance.

12. The method of claim 9, further comprising introducing an influence from the observation likelihood on the estimated energy-dependent component of the speech model if the currently-observed energy-dependent component is determined to contain speech.

13. The method of claim 9, further comprising introducing an influence from the observation likelihood on the estimated energy-dependent component of the noise model if the currently-observed energy-dependent component is determined not to contain speech.

14. The method of claim 1, further comprising digitizing the audio signal, and wherein the portion of the audio signal comprises a frame of the digitized audio signal.

15. The method of claim 1, further comprising updating estimated energy-dependent variables of the noise model or the speech model, wherein the updates comprise a restriction on a magnitude of a value for energy-dependent variables in the noise or speech models.

16. The method of claim 15, wherein the updates to the noise model or the speech model comprise predictive components generated based on a signal-to-noise ratio restriction that defines a relationship between speech and noise levels.

17. The method of claim 15, wherein the updates to the noise model or the speech model comprise a dynamic distribution that restricts a range of values for the predictive components.

18. The method of claim 17, wherein the dynamic distribution comprises a component that restricts a change in values of the estimated energy-dependent variables between time steps, a component that restricts a range of values of the estimated energy dependent variables, and a component that restricts a relative range of values of the estimated energy-dependent variables.

19. The method of claim 17, wherein the dynamic distribution is comprised of factors with Gaussian form.

20. The method of claim 1, wherein the indication is transmitted to a speech decoder for use in identifying which portions of the audio signal include speech to be decoded.

21. The method of claim 1, wherein the energy-dependent and energy-independent components are Mel-frequency cepstral coefficients (MFCC) components.

22. The method of claim 1, wherein the energy-dependent component is MFCC C0 and the energy-independent component is selected from a group consisting of a component between MFCC C1 and MFCC C12.

23. A computer program product tangibly embodied in a computer storage device, the computer program product including instructions that, when executed, perform operations comprising:

receiving an audio signal;

determining an energy-independent component of a portion of the audio signal associated with a spectral shape of the portion;

determining an energy-dependent component of the portion associated with a gain level of the portion;

comparing the energy-independent and energy-dependent components to a speech model;

comparing the energy-independent and energy-dependent components to a noise model;

outputting an indication whether the portion of the audio signal more closely corresponds to the speech model or to the noise model based on the comparisons; and updating estimated energy-dependent variables of the noise model or the speech model, wherein the updates comprise a restriction on a magnitude of a value for energy-dependent variables in the noise or speech models.

24. The computer program product of claim 21, wherein the dynamic distribution is comprised of factors with Gaussian form.

25. The computer program product of claim 23, wherein the updates to the noise model or the speech model comprise predictive components generated based on a signal-to-noise ratio restriction that defines a relationship between speech and noise levels.

26. The computer program product of claim 23, wherein the updates to the noise model or the speech model comprise a dynamic distribution that restricts a range of values for the predictive components.

27. The computer program product of claim 23, wherein the dynamic distribution comprises a component that restricts a change in values of the estimated energy-dependent variables between time steps, a component that restricts a range of values of the estimated energy dependent variables, and a component that restricts a relative range of values of the estimated energy-dependent variables.

28. A computer-implemented method comprising:

receiving, at a computer system, an audio signal;

determining, by the computer system, an energy-independent component of a portion of the audio signal associated with a spectral shape of the portion;

determining, by the computer system, an energy-dependent component of the portion associated with a gain level of the portion;

updating energy-dependent variables of a speech model or a noise model with estimated values based on previously observed energy-independent components and energy-dependent components from the portion of the audio signal or from previously analyzed portions of the audio signal;

comparing the energy-independent and energy-dependent components to the speech model;

comparing the energy-independent and energy-dependent components to the noise model, wherein the speech and noise models comprise energy-dependent variables and energy-independent variables that are used in the comparison with energy-dependent and energy-independent components of the portion of the audio signal;

wherein the energy-independent variables receive greater weight in a determination of whether the portion of the audio signal is speech or noise if a confidence measure for the estimated energy-dependent variables is low; and outputting, by the computer system, an indication whether the portion of the audio signal more closely corresponds to the speech model or to the noise model based on the comparisons.

29. A system comprising:

a computer system;

a signal feature calculator of the computer system to determine energy-dependent and energy-independent Mel-frequency cepstral coefficients (MFCC) components associated with a portion of a received audio signal;

means for classifying the portion of the audio signal as speech or noise based on a comparison of the determined energy-dependent and energy-independent MFCC components to a speech model and a noise model, wherein the speech and noise models comprise a bi-variate dynamic distribution that places restrictions on individual speech and noise levels and simultaneously restricts a speech-to-noise ratio between the speech and noise levels; and an interface of the computer system to output an indication of whether the portion of the audio signal is classified as speech or noise.

30. The system of claim 29, wherein the speech and noise models comprise a hybrid of an extended Kalman filter and a Hidden Markov Model (HMM).

* * * * *

UNITED STATES PATENT AND TRADEMARK OFFICE

CERTIFICATE OF CORRECTION

PATENT NO. : 8,131,543 B1
APPLICATION NO. : 12/102611
DATED : March 6, 2012
INVENTOR(S) : Ron J. Weiss and Trausti T. Kristjansson It is certified that error appears in the above-identified patent and that said Letters Patent is hereby corrected as shown below:

Column 22, Claim 24, Line 9, delete "claim 21" and insert --claim 23--, therefor.

Signed and Sealed this
Twenty-second Day of May, 2012

David J. Kappos
*Director of the United States Patent and Trademark Office*